(12) United States Patent
Maekawa

(10) Patent No.: US 7,559,235 B2
(45) Date of Patent: Jul. 14, 2009

(54) TIRE AIR PRESSURE MONITORING SYSTEM, TIRE AIR PRESSURE SENSOR UNIT AND METHOD OF MONITORING-CONTROLLING TIRE AIR PRESSURE

(75) Inventor: Takahiro Maekawa, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 376 days.

(21) Appl. No.: 11/649,786

(22) Filed: Jan. 5, 2007

(65) Prior Publication Data
US 2007/0171038 A1 Jul. 26, 2007

(30) Foreign Application Priority Data
Jan. 26, 2006 (JP) .............................. 2006-017180

(51) Int. Cl.
G01M 17/02 (2006.01)
(52) U.S. Cl. ........................................ 73/146; 340/442
(58) Field of Classification Search ........ 73/146–146.8; 340/442–447
See application file for complete search history.

(56) References Cited

U.S. PATENT DOCUMENTS

| 4,067,288 | A | * | 1/1978 | Saito et al. ................ 116/34 R |
| 4,918,976 | A | * | 4/1990 | Fogal, Sr. .................... 73/40.7 |
| 4,969,350 | A | * | 11/1990 | Fogal, Sr. .................... 73/40.7 |
| 6,518,877 | B1 | * | 2/2003 | Starkey et al. .............. 340/447 |
| 2005/0160805 | A1 | * | 7/2005 | Taki ............................. 73/146 |

FOREIGN PATENT DOCUMENTS

JP 2005-526649 A 9/2005

* cited by examiner

Primary Examiner—Andre J Allen
Assistant Examiner—Jermaine Jenkins
(74) Attorney, Agent, or Firm—Foley & Lardner LLP

(57) ABSTRACT

A tire air pressure monitoring system includes: a sensor unit mounted to a tire and including: an air pressure sensor for outputting a tire air pressure, and a transmitter, a receiver for receiving a radio wave from the sensor unit; a tire air pressure monitoring controller for warning a vehicular occupant of a tire air pressure decrease when the tire air pressure is less than or equal to a warning threshold. A puncture sensor for sensing a puncture of the tire, and a puncture repairing agent use sensor for sensing whether or not the puncture is repaired by using a puncture repairing agent after the puncture is sensed. When the puncture repairing agent use sensor senses that the punctured tire is repaired using the puncture repairing agent, the tire air pressure monitoring controller continues the warning even though the tire air pressure from the air pressure sensor is normal.

17 Claims, 11 Drawing Sheets

ORDINARY STATE
(TIRE CROSS SECTION)

PUNCTURE OCCUR,
PUNCTURE REPAIRING
AGENT USED
(TIRE CROSS SECTION)

PUNCTURE OCCUR,
PUNCTURE REPAIRING
AGENT USED, THEN TIRE
AIR PRESSURE DECREASED
(TIRE CROSS SECTION)

TIRE AIR PRESSURE MONITORING SYSTEM, TIRE AIR PRESSURE SENSOR UNIT AND METHOD OF MONITORING-CONTROLLING TIRE AIR PRESSURE

BACKGROUND OF THE INVENTION

1. Field of the Invention

The present invention relates to a tire air pressure monitoring system and a tire air pressure sensor unit which directly sense a tire air pressure of each wheel. Moreover, the present invention relates to a method of monitoring-controlling the tire air pressure.

2. Description of the Related Art

JP2005526649T discloses a conventional device and a conventional method which are directed to coping with a tire pressure loss and running flat phenomenon. Specifically, in the case of puncture occurrence according to JP2005526649T, a sealing compound is automatically filled, followed by alarming a flat traveling.

However, with a tire air pressure monitoring system (TPMS: Tire Pressure Monitoring System) for directly sensing the tire air pressure of each wheel, when a vehicular occupant manually repairs the puncture by using a puncture repairing agent, the hole of an air pressure sensor is blocked, making it impossible to sense the air pressure in the tire, or resulting in sensing of an erroneous value. Therefore, an abnormal air pressure decrease to be caused afterward cannot be sensed, falling to warn the vehicular occupant of the tire air pressure decrease.

SUMMARY OF THE INVENTION

In view of the above background of the invention, it is an object of the present invention to provide a tire air pressure monitoring system and a tire air pressure sensor unit (1, 2, 3, 4) which are capable of informing the vehicular occupant of a possible tire air pressure decrease after the user repairs the puncture by using a puncture repairing agent.

According to a first aspect of the present invention, there is provided a tire air pressure monitoring system, comprising: 1) a sensor unit configured to be mounted to each tire of a vehicle and including: i) an air pressure sensor configured to output a tire air pressure, and ii) a transmitter configured to transmit a radio wave; 2) a receiver configured to receive the radio wave transmitted from the sensor unit; 3) a tire air pressure monitoring controller configured to warn a vehicular occupant of a tire air pressure decrease when the tire air pressure is less than or equal to a warning threshold, the tire air pressure monitoring system further comprising: 4) a puncture sensor configured to sense a puncture of the tire, and 5) a puncture repairing agent use sensor configured to sense whether or not the puncture is repaired by using a puncture repairing agent after the puncture is sensed, wherein when the puncture repairing agent use sensor senses that the punctured tire is repaired by using the puncture repairing agent, the tire air pressure monitoring controller continues the warning even though the tire air pressure from the air pressure sensor is normal.

According to a second aspect of the present invention, there is provided a method of monitoring-controlling a tire air pressure, comprising: 1) sensing the tire air pressure, including the following sub-operations: i) outputting the tire air pressure, and ii) transmitting a radio wave; 2) a receiving the radio wave transmitted from the transmitting; 3) monitoring-controlling to warn a vehicular occupant of a tire air pressure decrease when the tire air pressure is less than or equal to a warning threshold, the monitoring-controlling further comprising: 4) puncture sensing for sensing a puncture of a tire, and 5) puncture repairing agent use sensing for sensing whether or not the puncture is repaired by using a puncture repairing agent after the puncture sensing, wherein when the puncture repairing agent use sensing senses that the punctured tire is repaired by using the puncture repairing agent, the monitoring-controlling continues the warning even though the tire air pressure from the outputting is normal.

According to a third aspect of the present invention, there is provided a tire air pressure monitoring system, comprising: 1) sensing means mounted to each tire of a vehicle and including: i) air pressure sensing means for outputting a tire air pressure, and ii) transmitting means for transmitting a radio wave; 2) receiving means for receiving the radio wave transmitted from the sensing means; 3) monitoring-controlling means for warning a vehicular occupant of a tire air pressure decrease when the tire air pressure is less than or equal to a warning threshold, the tire air pressure monitoring system further comprising: 4) puncture sensing means for sensing a puncture of the tire, and 5) puncture repairing agent use sensing means for sensing whether or not the puncture is repaired by using a puncture repairing agent after the puncture is sensed, wherein when the puncture repairing agent use sensing means senses that the punctured tire is repaired by using the puncture repairing agent, the monitoring-controlling means continues the warning even though the tire air pressure from the air pressure sensing means is normal.

According to a fourth aspect of the present invention, there is provided a tire air pressure monitoring system, comprising: 1) a sensor unit configured to be mounted to each tire of a vehicle and including: i) an air pressure sensor configured to output a tire air pressure, and ii) a transmitter configured to transmit a radio wave; and 2) a receiver configured to receive the radio wave transmitted from the sensor unit; wherein the tire air pressure monitoring system is configured to warn a vehicular occupant of a tire air pressure decrease when the tire air pressure is less than or equal to a warning threshold, and in a case that a puncture is sensed to occur to the tire: when the punctured tire is sensed to be repaired by using a puncture repairing agent, the tire air pressure monitoring system continues the warning even though the tire air pressure from the air pressure sensor is normal.

According to a fifth aspect of the present invention, there is provided a tire air pressure sensor unit configured to be mounted to each tire of a vehicle and including an air pressure sensor and a transmitter, the tire air pressure sensor unit comprising: 1) a puncture sensor configured to sense a puncture of the tire, and 2) a puncture repairing agent use sensor configured to sense whether or not the puncture is repaired by using a puncture repairing agent after the puncture is sensed, wherein when the punctured tire is sensed to be repaired by using the puncture repairing agent, the tire air pressure sensor unit stops transmitting a piece of tire air pressure information or transmits a piece of repairing agent use information.

The other object(s) and feature(s) of the present invention will become understood from the following description with reference to the accompanying drawings.

BRIEF DESCRIPTION OF THE DRAWINGS

FIG. 4 sets forth issues brought about when the puncture is repaired by using a puncture repairing agent, according to a background art, where

[I] denotes burst or puncture occurrence, [II] denotes an ordinary tire air pressure decrease, [III] denotes a puncture sensing threshold Ts, [IV] denotes tire air pressure decrease after puncture occurrence, and M denotes tire air pressure decrease after burst occurrence.

Figure 6:
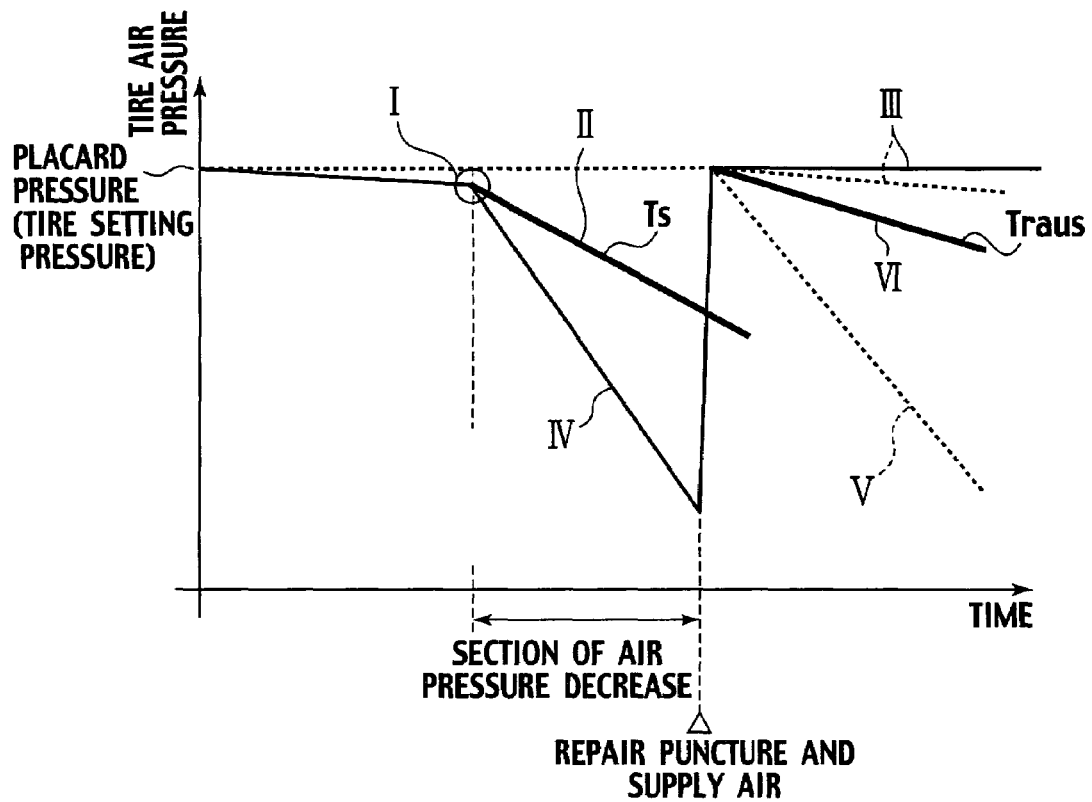

FIG. 6 shows tire air pressure characteristics including: i) an actual tire air pressure obtained when the puncture is repaired by using the puncture repairing agent, ii) the puncture sensing threshold Ts [II], and iii) a repairing agent use sensing threshold Traus [VI].

Figure 7:
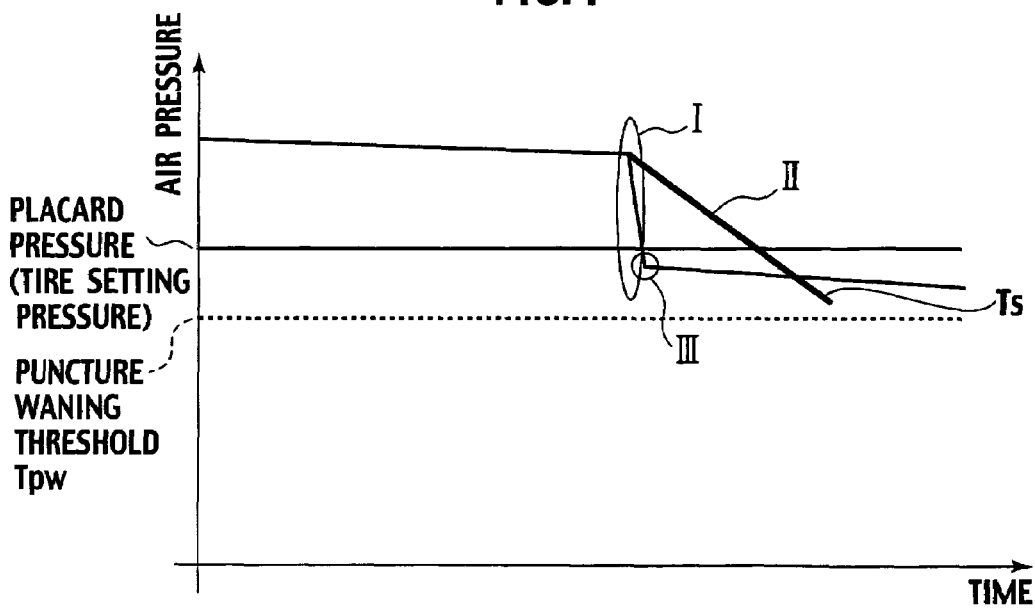

FIG. 7 shows tire air pressure characteristics including: i) an actual tire air pressure obtained when the user resets the tire air pressure (which was set high for high speed way traveling) to a placard pressure (tire setting pressure) and ii) the puncture sensing threshold Ts.

Figure 8:
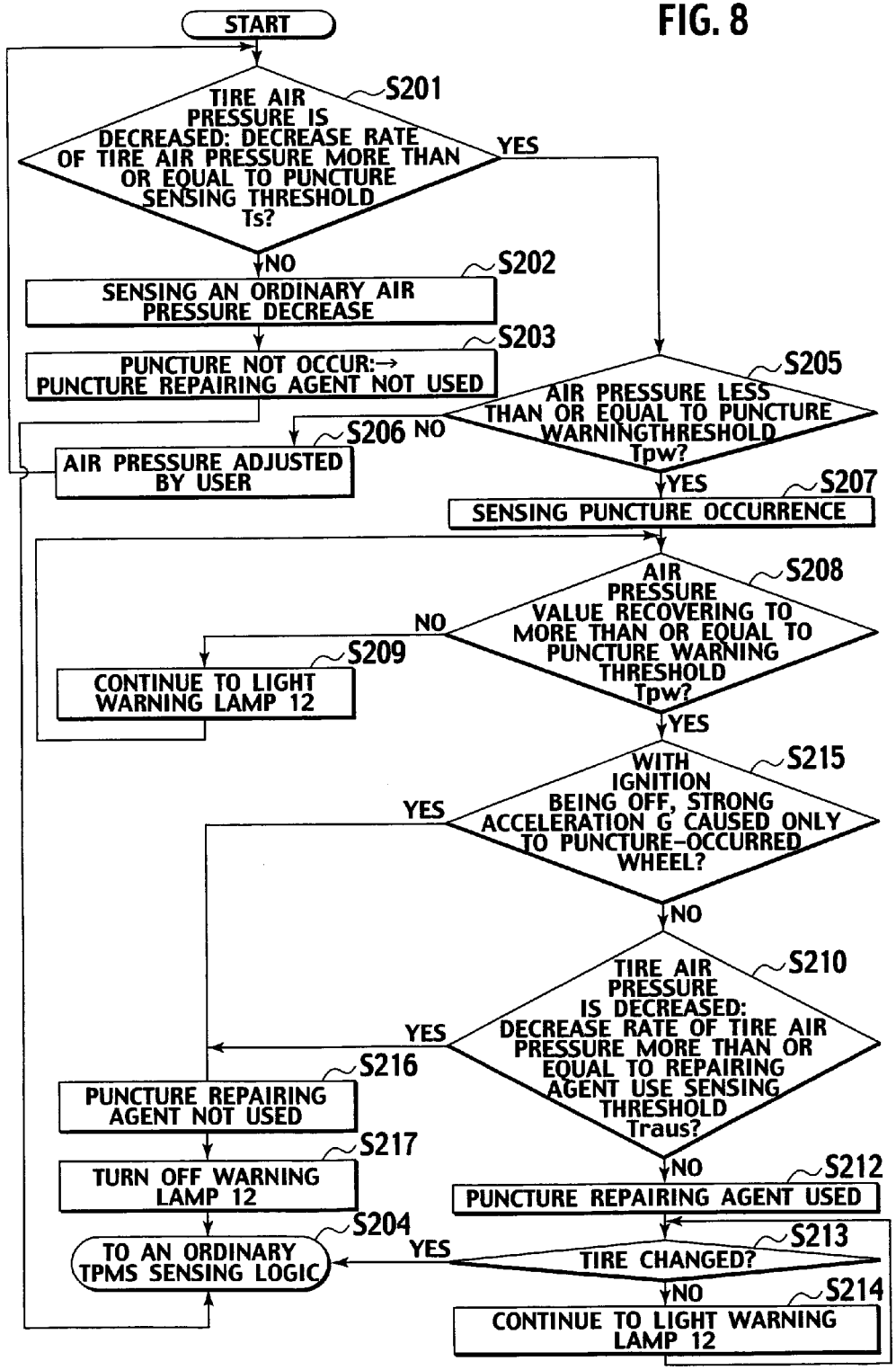

FIG. 8 is a flow chart of the tire air pressure monitoring control operations implemented by the control ECU, according to the second embodiment of the present invention.

Figure 9A:
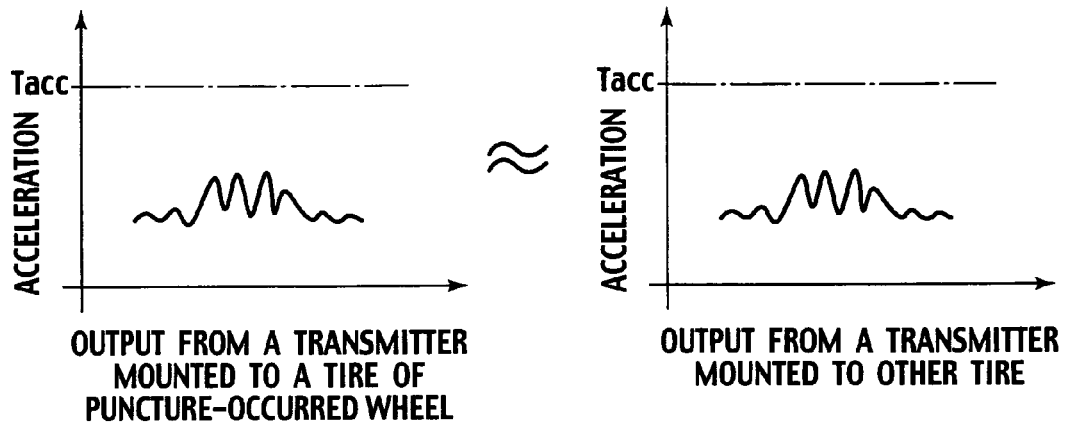
Figure 9B:
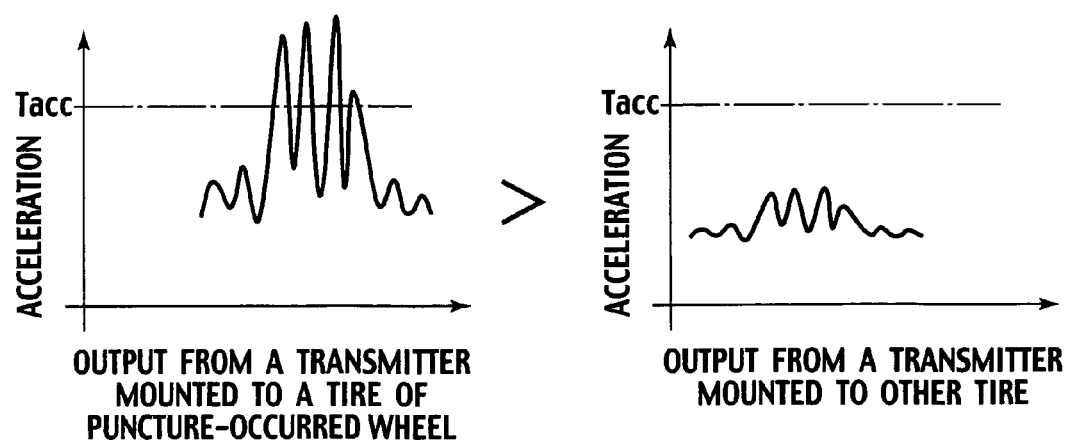

FIG. 9 shows acceleration characteristics of tires wherein,

FIG. 9A shows a state where the user repairs the puncture by using the puncture repairing agent with the punctured tire mounted to the vehicle, and FIG. 9B shows a state where the user repairs the puncture by using rubber, putty and the like with the punctured tire dismounted from the vehicle.

Figure 10:
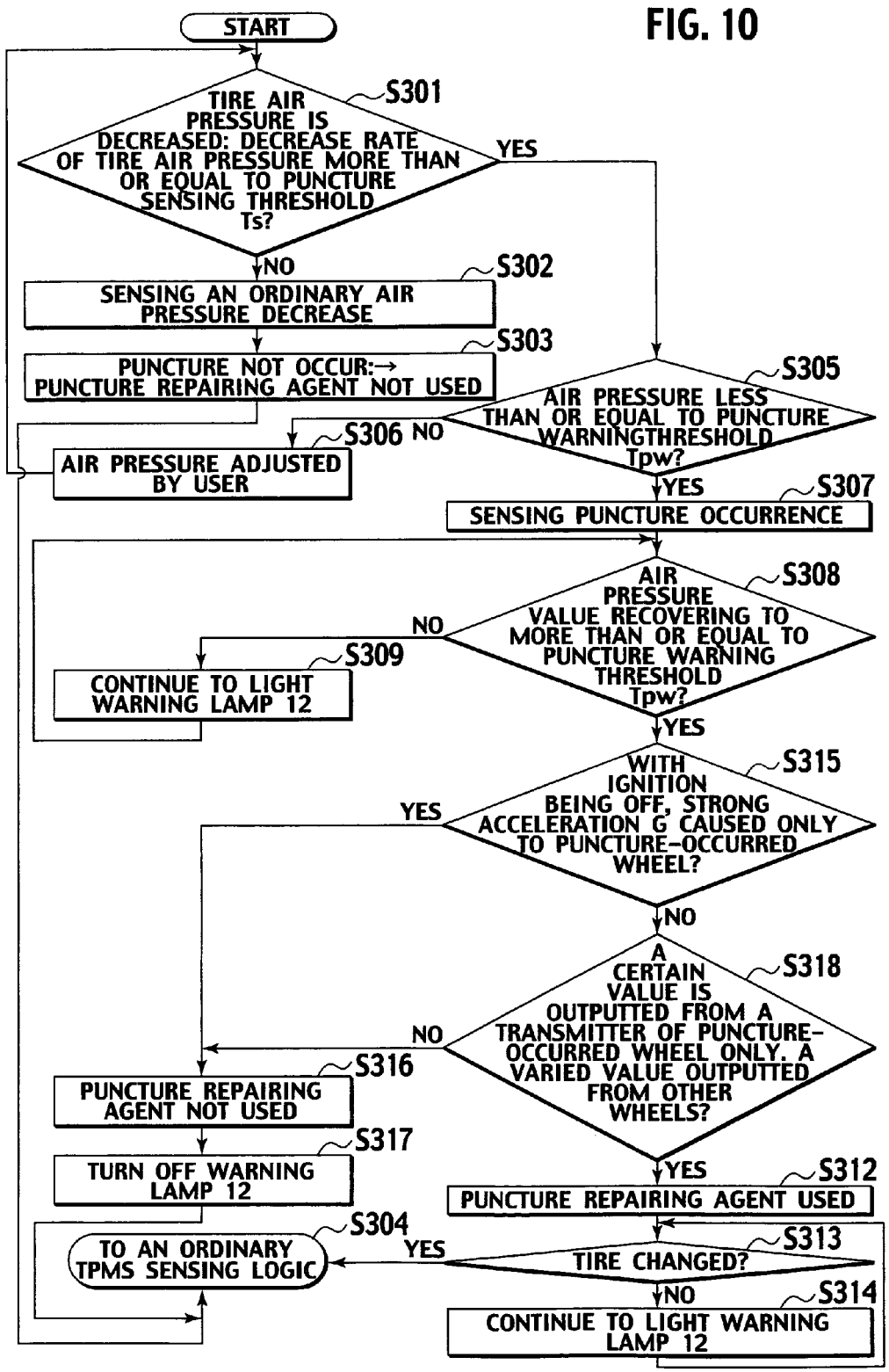

FIG. 10 is a flow chart of the tire air pressure monitoring control operations implemented by the control ECU, according to the third embodiment of the present invention.

Figure 11A:
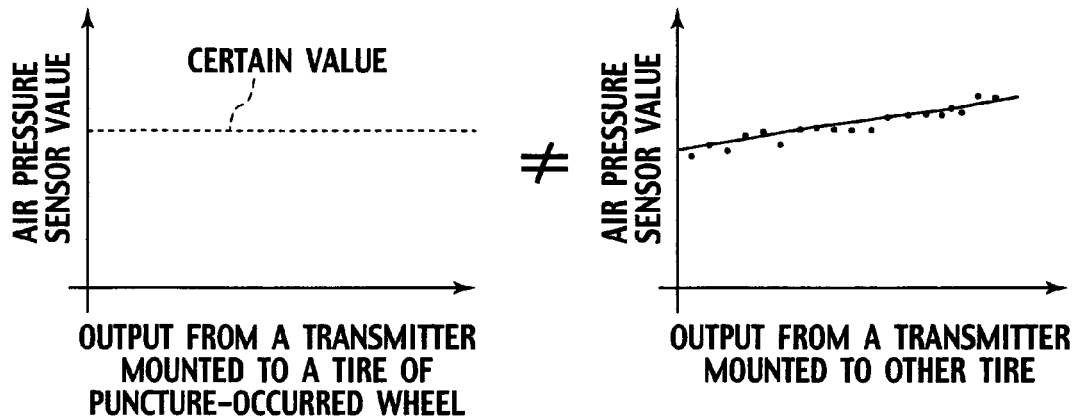
Figure 11B:
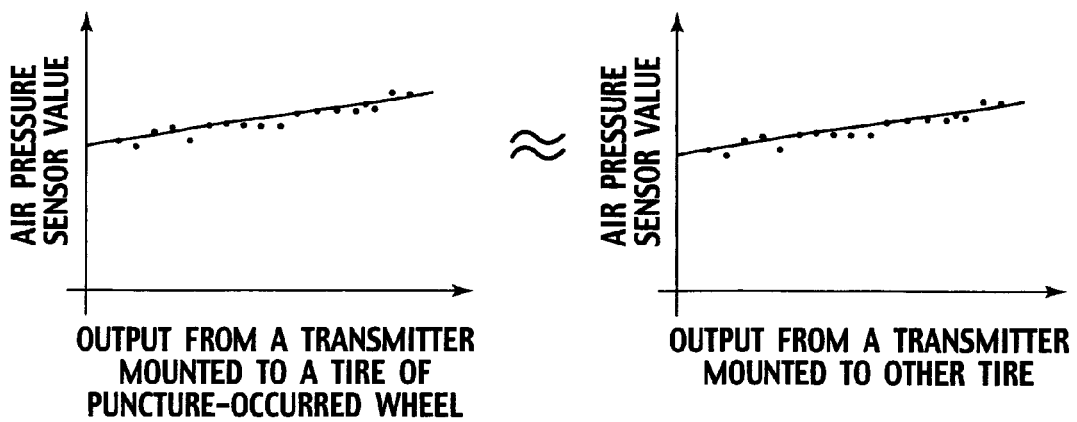

FIG. 11 shows variation characteristics of the air pressure sensor values wherein, FIG. 11A shows a first pattern in which the punctured hole is blocked with the puncture repairing agent, and FIG. 11B shows a second pattern in which the punctured hole is blocked with rubber, putty and the like instead of the puncture repairing agent.

Figure 12:
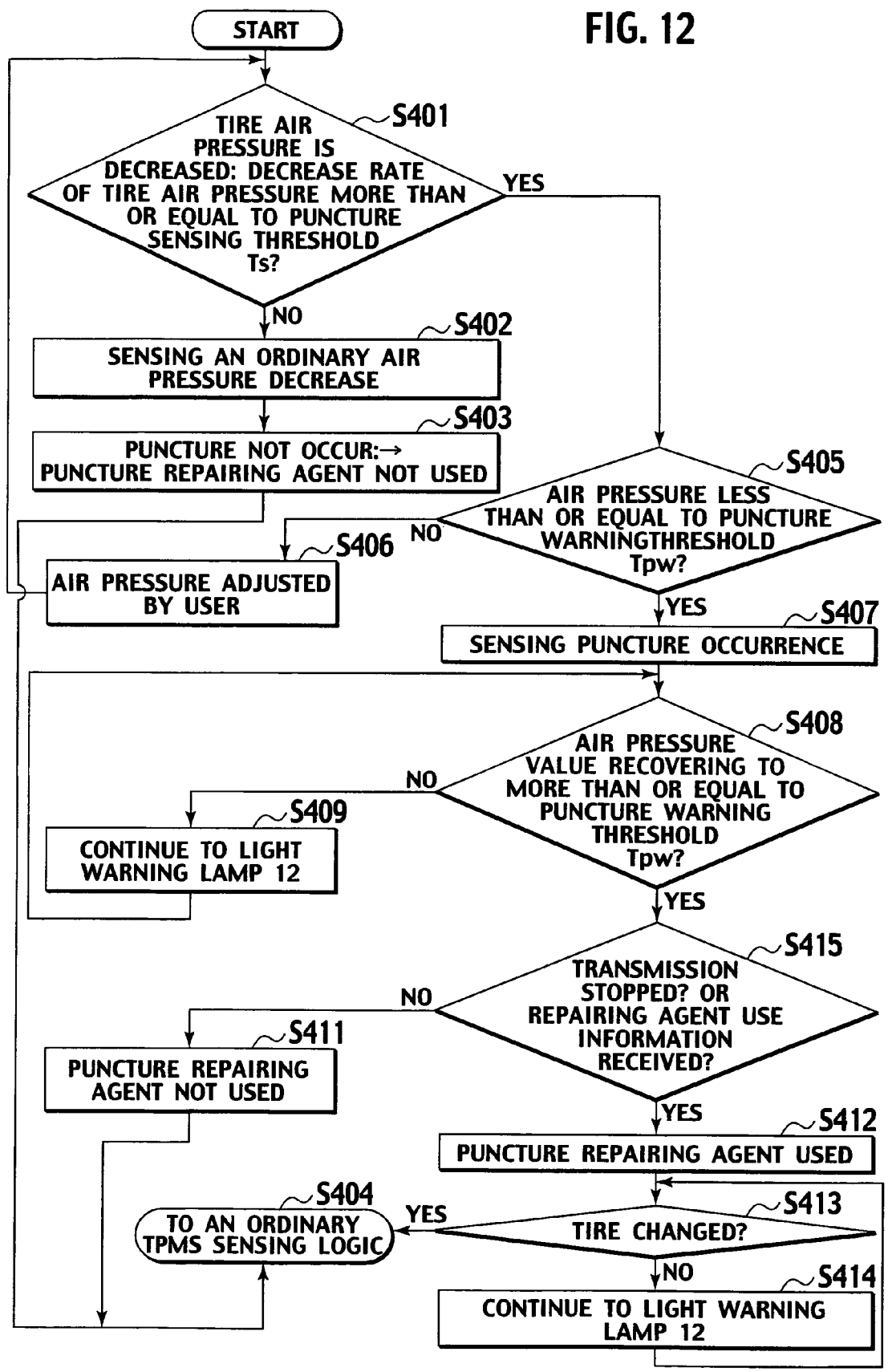

FIG. 12 is a flow chart of the tire air pressure monitoring control operations implemented by the control ECU, according to the fourth embodiment of the present invention.

Figure 13:
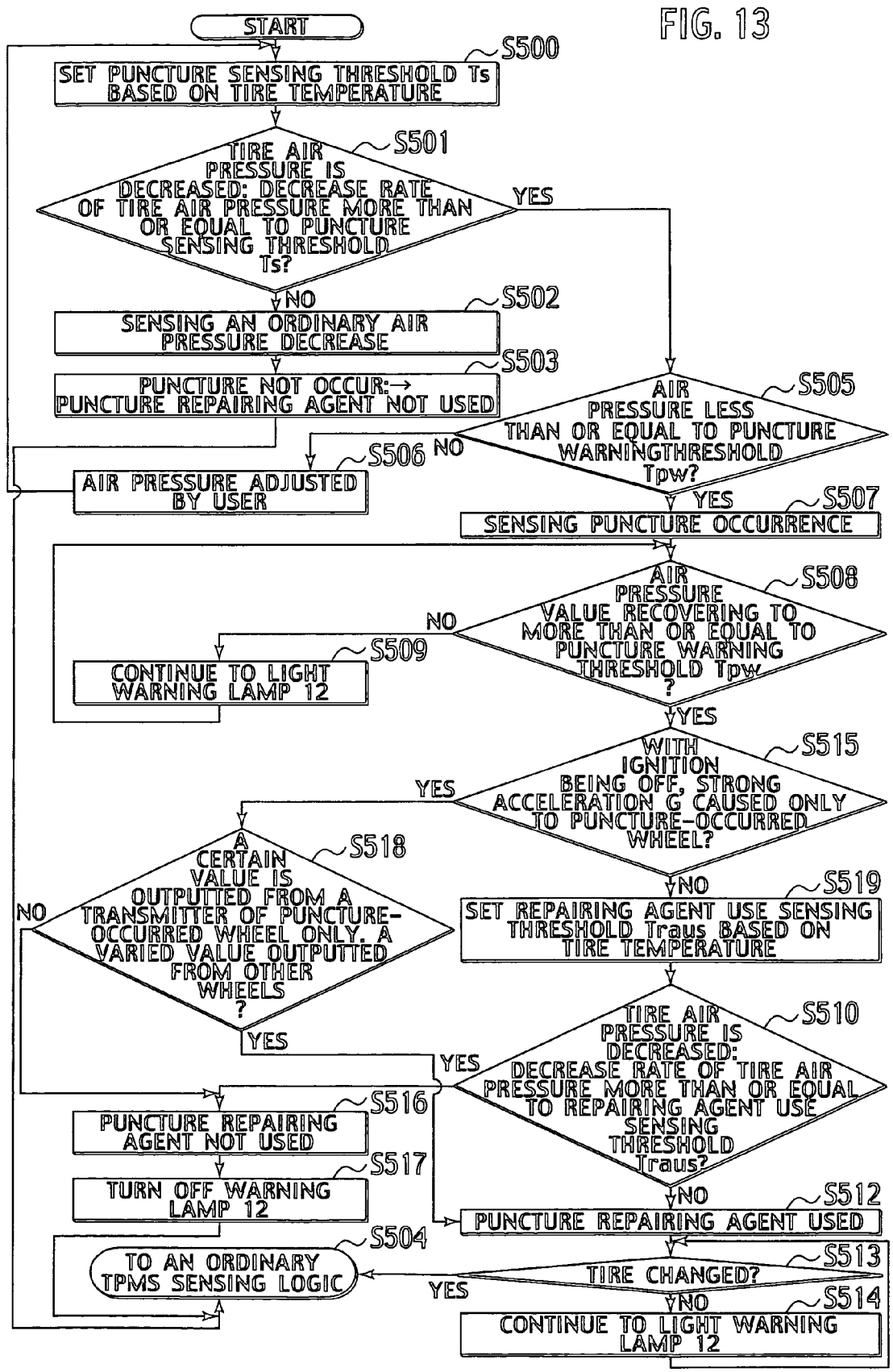

FIG. 13 is a flow chart of the tire air pressure monitoring control operations implemented by the control ECU, according to the fifth embodiment of the present invention.

DESCRIPTION OF THE PREFERRED EMBODIMENTS

Hereinafter, a tire air pressure monitoring system 20 is to be set forth, according to first to fifth embodiments of the present invention.

First Embodiment (Structure)

First, a structure of the tire air pressure monitoring system 20 is to be set forth, according to the first embodiment.

Figure 1:
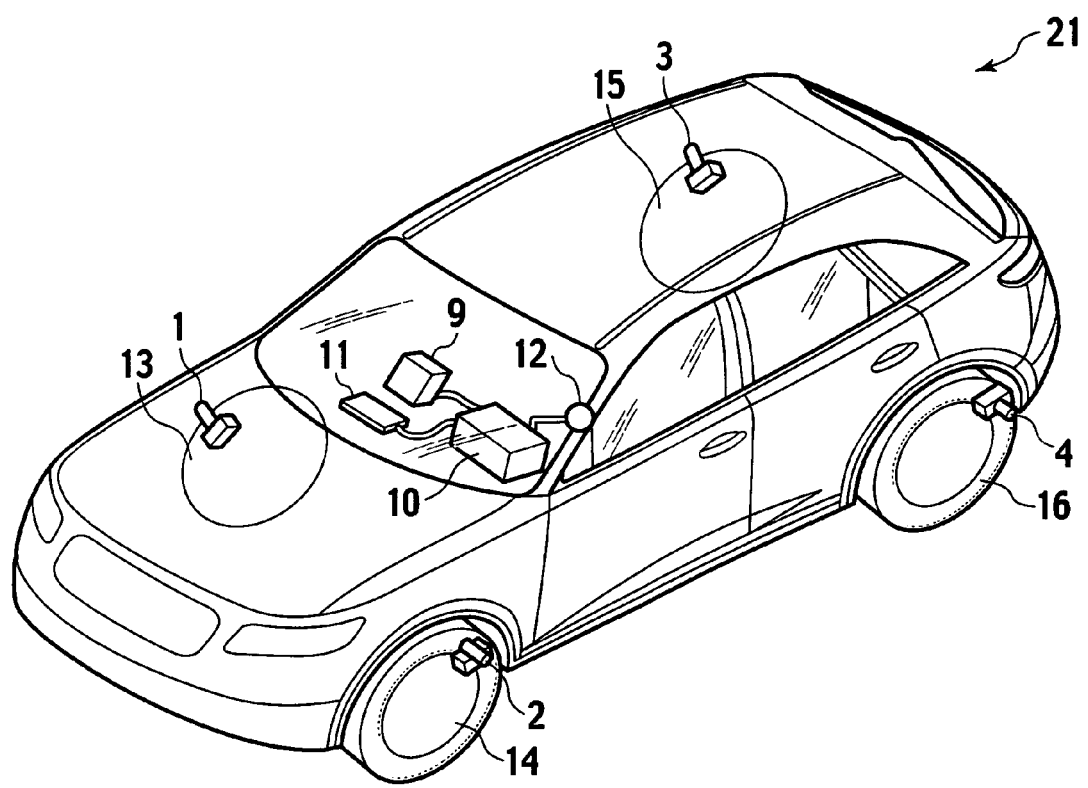
FIG. 1 is an entire perspective view of a vehicle to which a tire air pressure monitoring system is applied, according to first to fifth embodiments of the present invention.
Figure 2:
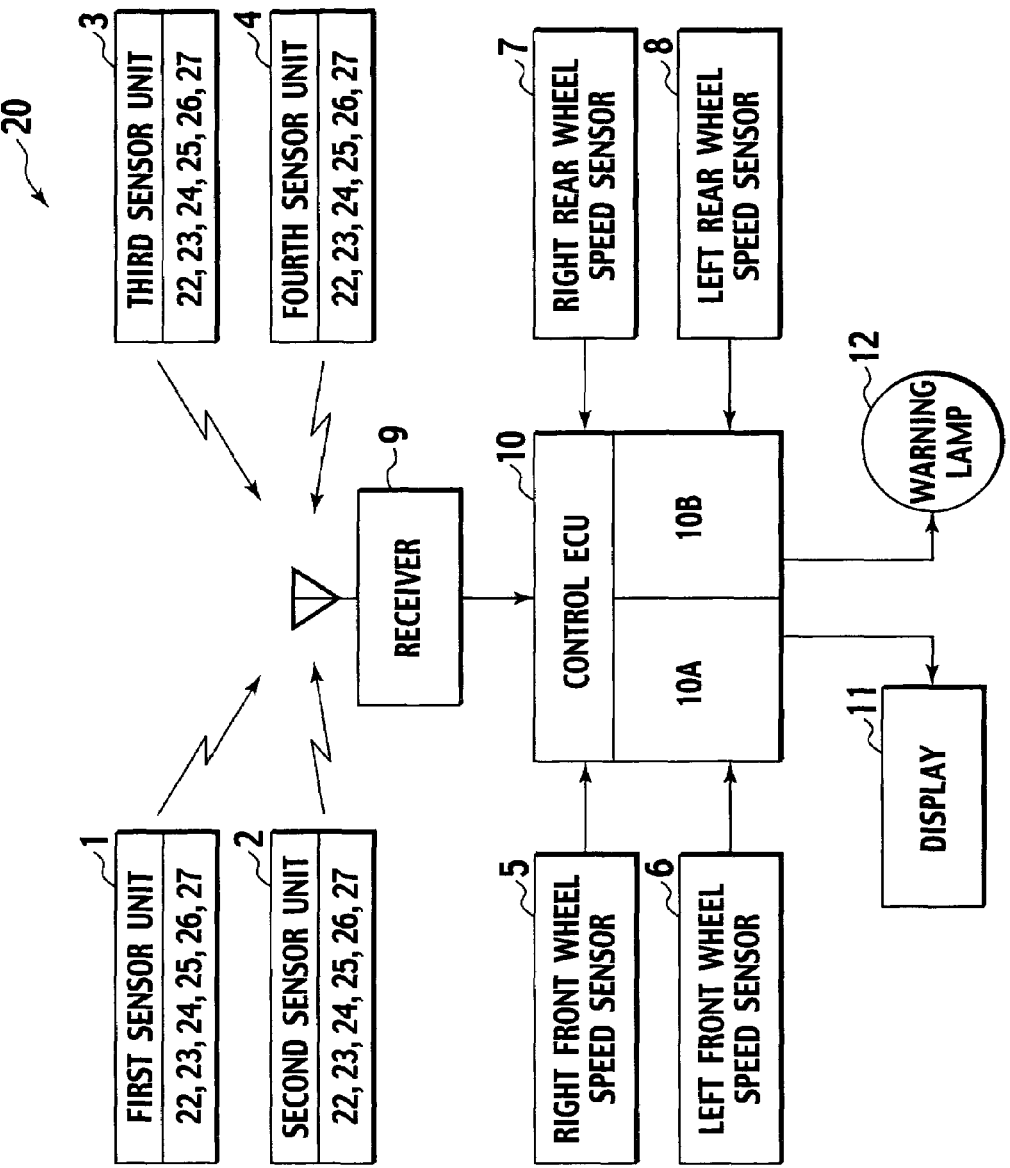
FIG. 2 is a control block diagram of the tire air pressure monitoring system, according to the first to fifth embodiments of the present invention.

FIG. 1 shows an entire perspective view of a vehicle 21 to which the tire air pressure monitoring system 20 is applied, according to the first embodiment; while FIG. 2 shows a control block diagram of the tire air pressure monitoring system 20, according to the first embodiment As shown in FIG. 1 and FIG. 2, the tire air pressure monitoring system 20 according to the first embodiment includes: a first sensor unit 1, a second sensor unit 2, a third sensor unit 3, a fourth sensor unit 4, a right front wheel speed sensor 5, a left front wheel speed sensor 6, a right rear wheel speed sensor 7, a left rear wheel speed sensor 8, a receiver 9, a control ECU 10 (tire air pressure monitoring controller), a display 11, and a warning lamp 12.

Each of the above sensor units 1, 2, 3, 4 is mounted to one of respective tires 13, 14, 15, 16, for example, by the following methods: i) integrating with a tire valve and ii) directly mounting to a disk wheel. Each of the sensor units 1, 2, 3, 4 includes: i) an air pressure sensor 22 for sensing tire air pressure, ii) a battery 23 as a power source, iii) a centrifugal switch 24 for outputting a trigger signal for data transmission, iv) a transmitter 25 provided with a coil antenna, v) a temperature sensor 26 for sensing tire temperature, and vi) a sensor controller (ASIC: Application Specific Integrated Circuit) 27 for transacting each piece of information. Then, for example, based on the trigger signal from the centrifugal switch 24, tire air pressure information and tire temperature information are transmitted according to speed of the vehicle 21, together with a sensor ID (identification code) at a certain time interval. In addition, the battery 23 has a finite lifetime. With the following structures and operations, however, each of the sensor units 1, 2, 3, 4 can be free from the battery 23 (i.e., battery-less): Replacing the receiver 9 with a transceiver capable of transacting and receiving measurement results. Allowing the transmitter 25 to serve as a transponder for transmitting results from the tire air pressure sensor 22 and tire temperature sensor 26, thereby returning a signal based on an energy per se of a signal transmitted from the transceiver.

Each of the wheel speed sensors 5, 6, 7, 8 includes: i) a sensor rotor mounted to a rotary shaft of each of the respective wheels and ii) a pick up mounted on body side of the vehicle 21. For example, in the vehicle 21 having an ABS (Antilock Brake System), a sensor for obtaining wheel speed information is used for the wheel speed sensors 5, 6, 7, 8. The right front wheel speed sensor 5 senses right front wheel speed, the left front wheel speed sensor 6 senses left front wheel speed, the right rear wheel speed sensor 7 senses right rear wheel speed, and the left rear wheel speed sensor 8 senses left rear wheel speed, outputting respective signals to the control ECU 10.

The receiver 9 having a receiving antenna and a receiving circuit receives radio waves transmitted from the sensor units 1, 2, 3, 4 of the respective tires 13, 14, 15, 16. Then, the tire air pressure information, the tire temperature information and the sensor ID which three are received by the receiver 9 are outputted to the control ECU 10. The tire air pressure monitoring system 20 according to the first embodiment has the only one receiver 9 added to the control ECU 10.

When an air pressure of one of the tires 13, 14, 15, 16 is less than or equal to an air pressure warning threshold Tw, the control ECU 10 lights the warning lamp 12 for informing a vehicular occupant of the tire air pressure decrease, and turns on the display 11 (for example, display screen of a navigation system and the like) for displaying which of the tires 13, 14, 15, 16 has the air pressure decrease specified by the sensor ID. The control ECU 10 includes: i) a puncture sensing program 10A for sensing the puncture based on the tire air pressure information transmitted from each of the sensor units 1, 2, 3, 4 and ii) a puncture repairing agent use sensing program 10B for sensing whether or not the puncture is repaired by using a puncture repairing agent.

Figure 3:
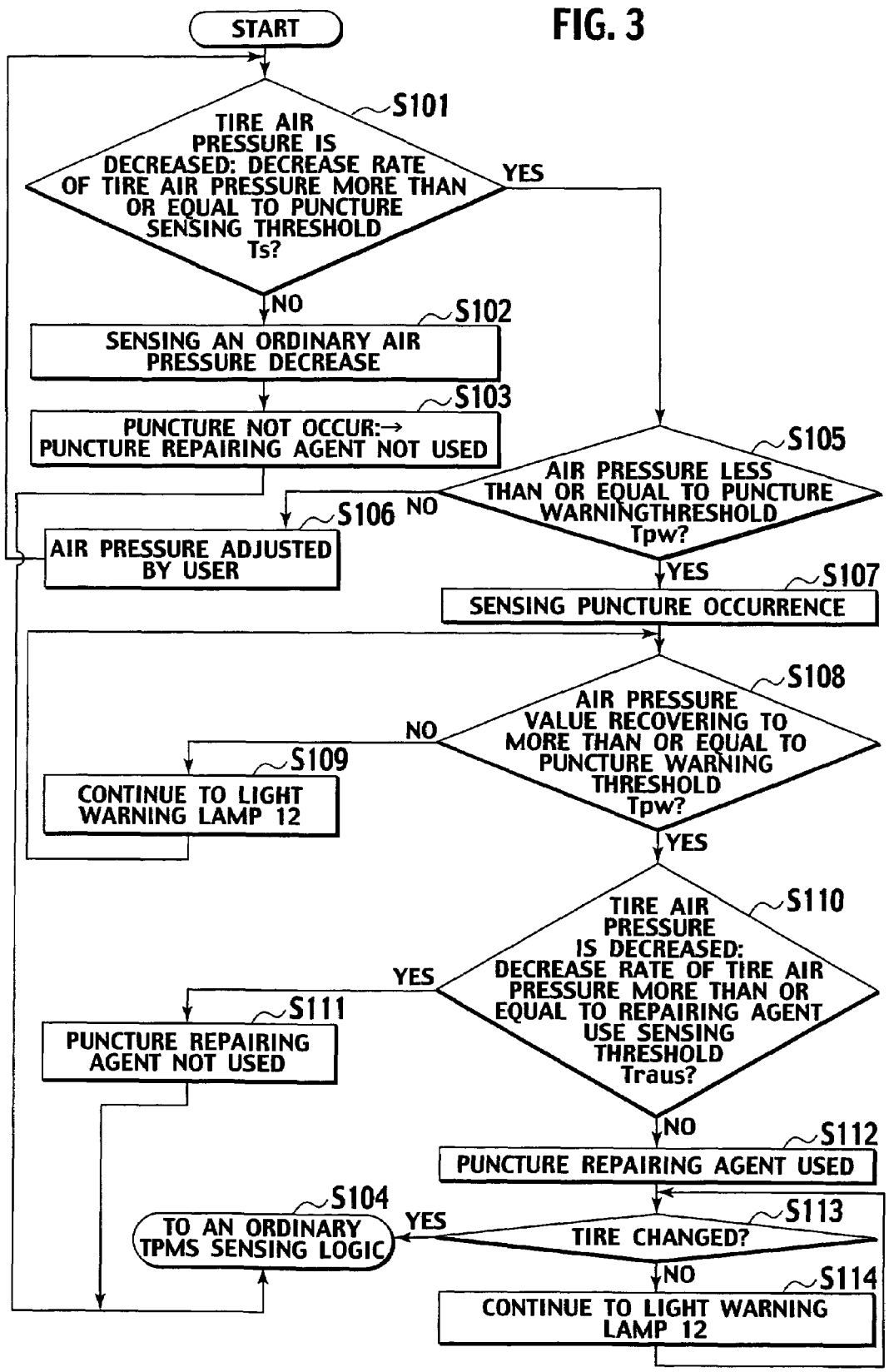
FIG. 3 is a flow chart of tire air pressure monitoring control operations implemented by a control ECU, according to the first embodiment of the present invention.

FIG. 3 is a flow chart showing a tire air pressure monitoring control operations implemented by the control ECU 10, according to the first embodiment Each step is to be set forth hereinafter.

<S101>

At step S101, a routine senses whether or not at least one of the four wheel tires 13, 14, 15, 16 has an air pressure decrease. In addition, the routine senses whether or not a value (=absolute value of decrease slope) showing decrease rate of the tire air pressure is more than or equal to a puncture sensing threshold Ts.

When No at step S101, the routine moves to step S102.

When Yes at step S101, the routine moves to step S105.

Herein, the puncture sensing threshold Ts is a value having a slope larger than that of a value showing a decrease rate at an ordinary tire air pressure decrease.

<S102>

At step S102, following the sensing at step S101 that the value showing the decrease rate of the tire air pressure is less than the puncture sensing threshold Ts, the routine senses that the value is the ordinary tire air pressure decrease which is a gradual air pressure release (decrease) due to traveling and the like. Then, the routine moves to step S103.

<S103>

At step S103, following the sensing of the ordinary tire air pressure decrease at step S102, the routine senses that the puncture repairing agent is not used due to no puncture occurrence. Then, the routine moves to step S1104.

<S104>

At step S104, following the sensing at step S103 that the puncture repairing agent is not used, the routine moves to an ordinary TPMS (=Tire Pressure Monitoring System) sensing logic which, like that implemented by an existing tire air pressure monitoring system, outputs warning when the air pressure sensor value is simply less than or equal to the air pressure warning threshold Tw.

<S105>

At step S105, following the sensing at step S101 that the value showing the decrease rate of the tire air pressure is more than or equal to the puncture sensing threshold Ts, the routine senses whether or not the tire air pressure from the air pressure sensor is less than or equal to a puncture warning threshold Tpw.

When Yes at step S105, the routine moves to step S107.

When No at step S105, the routine moves to step S106.

Herein, the puncture warning threshold Tpw may be set to a value equal to the air pressure warning threshold Tw, or set to a discrete value from the air pressure warning threshold Tw. For example, the puncture warning threshold Tpw can be set to a tire air pressure which is decreased by about 25% relative to a placard pressure (=tire setting pressure) (FIG. 7).

<S106>

At step S106, following the sensing at step S105 that the tire air pressure is more than the puncture warning threshold Tpw, the routine takes the following operations:

Even though the value showing the decrease rate of the tire air pressure is more than or equal to the puncture sensing threshold Ts at Step S101, the routine senses that the above air pressure decrease is within a range of a tire air pressure adjustment by a user until the tire air pressure decrease reaches the puncture warning threshold Tpw. Then, the routine returns to step S101.

<S107> (Sensing Puncture)

At step S107, following the sensing at step S105 that the tire air pressure is less than or equal to the puncture warning threshold Tpw, the routine senses that puncture or burst is caused to the tire. Then, the routine moves to step S108. That is, even though the value showing the tire air pressure decrease is more than or equal to the puncture sensing threshold Ts, the routine keeps from the puncture sensing (i.e., not implementing the puncture sensing) until the tire air pressure is less than or equal to the puncture warning threshold Tpw, since the above air pressure decrease may be caused by the user adjusting the tire air pressure. Then, at a time point when the tire air pressure is less than or equal to the puncture warning threshold Tpw, the routine senses occurrence of the puncture or burst to the tire.

<S108>

At step S108, following the sensing at step S107 that the tire puncture has occurred, the routine senses whether or not the tire air pressure recovers to more than or equal to the puncture warning threshold Tpw.

When Yes at step S108, the routine moves to step S110.

When No at step S108, the routine moves to step S109.

<S109>

At step S109, following the sensing at step S108 that the tire air pressure does not recover to more than or equal to the puncture warning threshold Tpw, the routine continues to light the warning lamp 12. Then, the routine returns to step S108.

<S110>

At step S110, following the sensing at step S108 that the tire air pressure recovered to more than or equal to the puncture warning threshold Tpw, the routine monitors change in the tire air pressure after the recovery of the tire air pressure. Then, the routine senses whether or not the value showing the decrease rate of the tire air pressure is more than or equal to a repairing agent use sensing threshold Traus which is smaller than the value showing the decrease rate attributable to the ordinary tire air pressure decrease.

When Yes at step S110, the routine moves to step S111.

When No at step S110, the routine moves to step S112.

<S111>

At step S111, following the sensing at step S110 that the value showing the decrease rate of the tire air pressure after the recovery of the tire air pressure is more than or equal to the repairing agent use sensing threshold Traus, the routine senses that the puncture repairing agent is not used. Then, the routine moves to step S104.

<S112> (Sensing Puncture Repairing Agent Use)

At step S112, following the sensing at step S110 that the value showing the decrease rate of the tire air pressure after the recovery of the tire air pressure is less than the repairing agent use sensing threshold Traus, the routine senses that the puncture repairing agent is used. Then, the routine moves to step S113.

<S113>

At step S113, following the sensing at step S112 that the puncture repairing agent is used, the routine senses whether or not the punctured tire is changed.

When Yes at step S113, the routine moves to step S104.
When No at step S113, the routine moves to step S114.

Herein, a method for sensing that the tires 13, 14, 15, 16 or the sensor units 1, 2, 3, 4 is changed includes: i) sensing that the sensor ID sent from the sensor units 1, 2, 3, 4 to the control ECU 10 is changed, ii) a failure diagnoser at a dealer giving an instruction to the control ECU 10, iii) and the like.

<S114>

At step S114, following the sensing at step S113 that the punctured tire is not changed, the routine continues to light the warning lamp 12. Then, the routine repeats the sensing at step S113.

[Conventional Operation]

Then, the operation of the tire air pressure monitoring system is to be set forth, according to a conventional technology.

[Background Art]

First, the tire air pressure monitoring system is configured to include the following simple operations:

i) sensing whether or not the air pressure value sent to the receiver from the air pressure sensor mounted to each of the four wheel tires is less than or equal to a certain threshold, ii) with the air pressure value less than or equal to the certain threshold, informing the user of the status by lightning the warning lamp or the like, iii) with the air pressure recovering to more than or equal to the certain value, turning off the warning lamp.

Figure 4A:
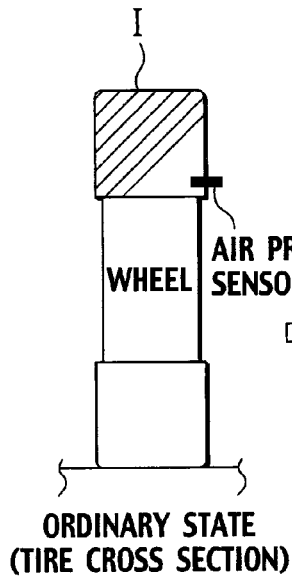
FIG. 4A shows an ordinary state.
Figure 4B:
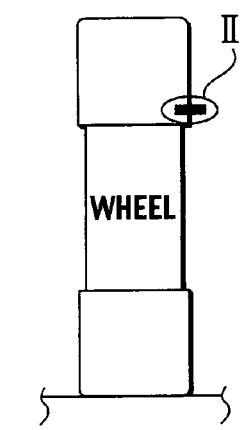
FIG. 4B shows that the puncture has occurred and the puncture repairing agent is used.
Figure 4C:
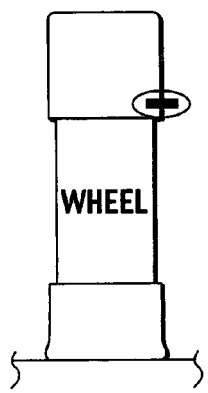
FIG. 4C shows a state where the tire air pressure is decreased.

Herein, there used to be one problem. When the puncture repairing agent is used for repairing the puncture of the vehicle including the tire air pressure monitoring system, blocking of the air pressure sensor's hole for sensing pressure or other causes may send a false information to the user. That is, as shown in FIG. 4A, ordinarily, the air pressure sensor measures and outputs the pressure in the tire denoted by oblique lines, causing no problem (see [I] of FIG. 4A). As shown in FIG. 4B, using the puncture repairing agent, however, may block the hole of the air pressure sensor, disabling sensing of the air pressure in the tire, or sensing an erroneous value (see [II] of FIG. 4B). Namely, such a phenomenon may occur as the air pressure sensor outputs an air pressure value of a space in the air pressure sensor, thereby the control ECU turns off the warning lamp with the air pressure from the sensor reaching more than or equal to the certain threshold. When the tire air pressure is decreased due to the traveling after the puncture is repaired by using the puncture repairing agent, it is necessary to output the warning. FIG. 4C shows a state where the puncture has occurred, the puncture repairing agent is used, and then the tire air pressure is decreased. The air pressure sensor continues transmitting to the control ECU the certain value in the sensor which value is not decreased despite the tire air pressure decrease, failing to sense an abnormality.

Therefore, once the puncture repairing agent is used, as the case may be, the warning lamp is not lighted with the sensed value kept normal even though the air pressure is decreased. Therefore, reliability of the tire air pressure monitoring system cannot be secured. As a result, the puncture repairing agent cannot be used for the vehicle including the tire air pressure monitoring system, failing to setting a spare tireless. Hereinabove, the setting of the spare tireless is defined as continuously providing the vehicle with the puncture repairing agent in place of a spare tire, bringing about effects such as: i) the space for the spare tire usable otherwise, and ii) contribution to lighter weight and lower cost. Thereby, sensing whether or not the puncture repairing agent is necessary.

Meanwhile, according to the related art disclosed in the JP2005526649T, the device installed outside the vehicle automatically fills the puncture repairing agent at the puncture occurrence, then lights a flat traveling warning lamp. According to the related art disclosed in the JP2005526649T, however, when the user manually uses the puncture repairing agent, whether or not the puncture repairing agent is used cannot be sensed. Moreover, further installing the external device as set forth above may increase cost and restrict vehicular layout.

(Operation of Tire Air Pressure Monitoring Control)

On the contrary, the tire air pressure monitoring system 20 according to the first embodiment of the present invention pays attention to a point that the decrease rate of the tire air pressure after the recovery of the tire air pressure is differentiated by whether or not the puncture repairing agent is used. At the puncture occurrence, whether or not the puncture repairing agent is used is sensed. When the routine senses that the puncture repairing agent is used, the warning is kept outputted. With the above operations according to the first embodiment of the present invention, when the puncture is repaired by using the puncture repairing agent, the vehicular occupant thereafter can be informed of a possible decrease in the tire air pressure.

Hereinafter, the operation of tire air pressure monitoring control is to be set forth based on the flow chart of FIG. 3. First, the receiver 9 which is one in number receives the radio wave transmitted from each of the sensor units 1, 2, 3, 4 of one of the respective tires 13, 14, 15, 16, allowing the control ECU 10 to take in the tire air pressure information. Herein, with the tire air pressure decrease, the air pressure sensor 22 of each of the sensor units 1, 2, 3, 4 transmits, at least once, the tire air pressure information to the control ECU 10. Then, the larger the value showing the decrease rate of the tire air pressure, the shorter the frequency of transmitting to the control ECU 10 the tire air pressure information from the air pressure sensor 22 of each of the sensor units 1, 2, 3, 4.

In a normal state where the tire is free from causing the puncture or the like in the vehicle traveling and the like, the routine moves from step S101→step S102→step S103→step S104 in the flow chart of FIG. 3. At step S102, the routine senses that the tire air pressure decrease is ordinary. At step S103, the routine senses that the puncture repairing agent is not used due to no puncture occurrence. At step S104, like the existing tire air pressure monitoring system, the routine moves to the ordinary TPMS sensing logic for outputting warning when the air pressure sensor value is simply less than or equal to the air pressure warning threshold Tw.

Then, when the tire air pressure is more than the puncture warning threshold Tpw even though the value showing the decrease rate of the tire air pressure is more than or equal to the puncture sensing threshold Ts, the routine repeats step S101→step S105→step S106 in the flow chart of FIG. 3. That is, with the air pressure decrease attributable to the puncture or burst, the user, as a matter of course, adjusts the tire air pressure. With this, even though the value showing the decrease rate of the tire air pressure is more than or equal to the puncture sensing threshold Ts (at step S101), the routine senses (at step S106) that the above value is attributable to the user adjusting the tire air pressure, as long as the tire air pressure is more than the puncture warning threshold Tpw (at step S105).

Then, when the value showing the decrease rate of the tire air pressure is more than or equal to the puncture sensing threshold Ts, and the tire air pressure is less than or equal to the puncture warning threshold Tpw, the routine moves step S101→step S105→step S107 in the flow chart of FIG. 3. That is, when the value showing the decrease rate of the tire air pressure is more than or equal to the puncture sensing threshold Ts due to the puncture or burst (at step S101), and the tire air pressure is less than or equal to the puncture warning threshold Tpw (at step S105), the routine senses that the puncture or burst is caused (at step S107).

Then, when the routine senses at step S107 that the puncture is caused, the routine repeats step S108→step S109 until the tire air pressure recovers to more than or equal to the puncture warning threshold Tpw, continuing the lightning of the warning lamp 12.

With the decreased tire air pressure recovering to more than or equal to the puncture warning threshold Tpw after the sensing at step S107 that the puncture is caused, the routing moves from step S108 to step S110, monitors at step S110 the change in the tire air pressure after the recovery of the tire air pressure. Thereby, the routine senses whether or not the value showing the decrease rate of the tire air pressure is more than or equal to the repairing agent use sensing threshold Traus which is smaller than the value showing the decrease rate attributable to the ordinary tire air pressure decrease. In other words, the routine senses whether or not the puncture is repaired by using the puncture repairing agent.

Then, when the value showing the decrease rate of the tire air pressure is more than or equal to the repairing agent use sensing threshold Traus, the routine moves from step S110 to step S111→step S104. Namely, based on the sensing that the puncture repairing agent is not used (at step S111), the routine moves to the ordinary TPMS sensing logic (at step S104).

Meanwhile, when the value showing the decrease rate of the tire air pressure is less than the repairing agent use sensing threshold Traus, the routine moves from step S110 to step S112→step S113→step S114, and repeats step S113→step S114 unless the tire of the puncture-occurred wheel is changed. Namely, based on the sensing that the puncture is repaired by using the puncture repairing agent (at step S112), the routine continues lighting of the warning lamp 12 (at step S114) unless the tire is changed (at step S113). Herein, when the tire of the puncture-occurred wheel is changed after the puncture repairing by using the puncture repairing agent, the routine moves from step S113 to step S104, turns off the warning lamp 12 and then moves to the ordinary TPMS sensing logic (at step S104).

[Principle of Tire Air Pressure Monitoring Control]

Figure 5:
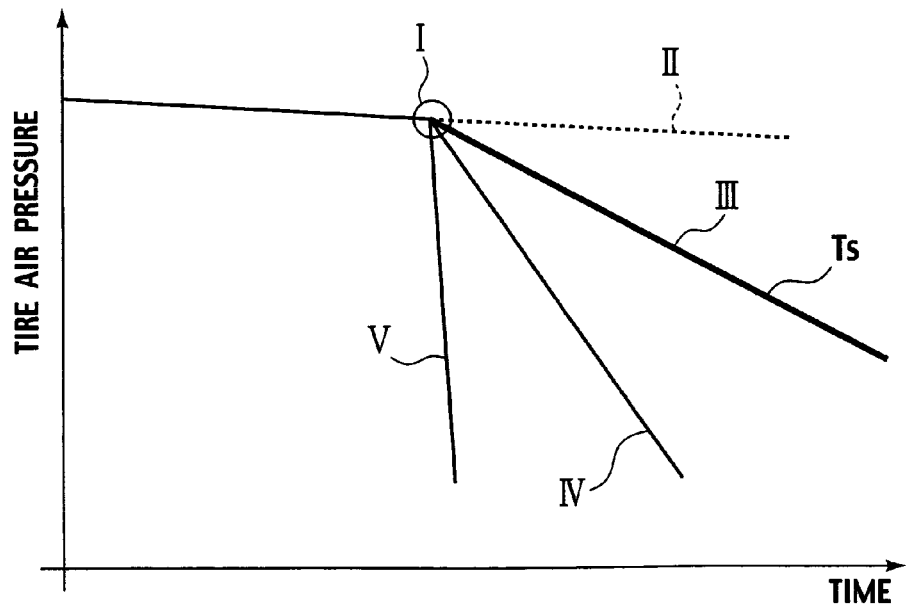
FIG. 5 shows air pressure characteristics of each tire, where

First, set forth below is a principle of sensing "whether or not the puncture is caused" based on the difference in the decrease rate of the tire air pressure, through the monitoring of the tire air pressure. As shown by the tire air pressure characteristic in FIG. 5, ordinarily, the air pressure is naturally decreased without the puncture and the like tire, the decrease rate is, however, as slow as by 3% to 5% per month (see [II] in FIG. 5). In FIG. 5, [I] denotes the burst or puncture occurrence, [II] denotes an ordinary tire air pressure decrease, [III] denotes the puncture sensing threshold Ts, [IV] denotes tire air pressure decrease after puncture occurrence, and M denotes tire air pressure decrease after burst occurrence. Once the burst is caused, however, the tire air pressure is rapidly decreased. Otherwise, the punctured tire (nail-stuck tire and the like) will also show a larger decrease rate of the air pressure than the normal tire does. Therefore, defining the threshold (=the puncture sensing threshold Ts) of the decrease rate of the tire air pressure can allow the control ECU 10 to sense whether the air pressure decrease is: i) caused by the puncture or burst or ii) caused naturally.

However, sensing the puncture occurrence based only on the decrease rate of the tire air pressure may cause a possibility that a manual adjustment of the air pressure is erroneously sensed as puncture, for example, in the following occasion: the user changes from a high tire air pressure (for high speed way traveling) to about the placard pressure (=tire setting pressure). That is, as shown in FIG. 7, when the user changes the high tire air pressure (for high speed way traveling) to about the placard pressure, an erroneous sensing is implemented in the following manner:

The air pressure is decreased (puncture occurrence) at the certain threshold or over→the air pressure is adjusted to about the placard pressure→the decrease rate of the tire air pressure is in the ordinary state.

With this, the control ECU senses the manually adjusted air pressure as the puncture occurrence, which is the erroneous sensing.

In FIG. 7, [I] denotes manual setting of air pressure, [II] denotes the puncture sensing threshold Ts and [III] denotes the decrease rate of the tire air pressure is more than or equal to the puncture sensing threshold Ts.

Thereby, according to the first embodiment, even though the value showing the decrease rate of the tire air pressure is more than or equal to the puncture sensing threshold Ts (at step S101), the routine senses that the decrease is attributable to the tire air pressure adjustment by the user (at step S106) as long as the tire air pressure is more than the puncture warning threshold Tpw (at step S105), thereby preventing the erroneous sensing of the manually adjusted air pressure as the puncture occurrence.

Then, set forth below is a principle of sensing at the puncture occurrence "whether or not the puncture repairing agent is used" based on the difference in the decrease rate of the tire air pressure, through the monitoring of the tire air pressure after the recovery of the tire air pressure.

In FIG. 6, [I] denotes burst or puncture occurrence, [II] denotes the puncture sensing threshold Ts, [III] denotes sensing that puncture repairing agent is used, [IV] denotes tire air pressure decrease after puncture occurrence, [V] denotes sensing that puncture repairing agent is not used, and [VI] denotes the repairing agent use sensing threshold Traus.

With the tire air pressure decreased by the puncture, the user, as a matter of course, adjusts the air pressure. When the puncture repairing agent is used for adjusting the air pressure, the punctured tire is repaired. Therefore, as shown in FIG. 6, the tire air pressure decrease is equivalent to an ordinary decrease rate of the air pressure, or is fixed to a certain value (when the sensing hole of the air pressure sensor is blocked with the repairing agent).

Meanwhile, simply supplying the tire air pressure without using the puncture repairing agent does not repair the punctured tire, causing the decrease rate of the tire air pressure more than the ordinary decrease rate of the air pressure.

Thereby, setting a threshold (=the repairing agent use sensing threshold Traus) to the decrease rate of the tire air pressure through the monitoring of the change of the tire air pressure after the user's adjustment of the tire air pressure at the puncture occurrence can sense whether or not the puncture repairing agent is used.

Herein, the repairing agent use sensing threshold Traus (see [VI] in FIG. 6) is to be set, for example, to a position between i) an air pressure decrease characteristic using the puncture repairing agent (see [III] in FIG. 6) and ii) an air pressure decrease characteristic not using the puncture repairing agent (see [V] in FIG. 6), as shown in FIG. 6.

In this cases, the repairing agent use sensing threshold Traus may be set to a certain value, that is, a constant value (Δ air pressure/Δ time), or set to a value which is variable with sensing time.

For example, when the repairing agent use sensing threshold Traus is set to the certain value based on decrease rate of the air pressure by 12% in 24 hours, an air pressure decrease of 0.5% per hour and 0.01% per 1 minute are each defined as a sensing standard. As a result, there is a possibility of erroneous sensing attributable to the sensor's noise or in relation to the air pressure sensor's bit rate.

For solving the above possible problem, the repairing agent use sensing threshold Traus (Δ air pressure/Δ time) may be varied with the sensing time, specifically, decrease of more than or equal to 1% per 1 minute, decrease of more than or equal to 3% per hour, and decrease of more than or equal to 12% per 24 hours may be defined as the sensing standard.

(Effect)

Then, effects of the tire air pressure monitoring system 20 are to be set forth, according to the first embodiment.

(1) A tire air pressure monitoring system, comprises: 1) a sensor unit configured to be mounted to each tire of a vehicle and including: i) an air pressure sensor configured to output a tire air pressure, and ii) a transmitter configured to transmit a radio wave; 2) a receiver configured to receive the radio wave transmitted from the sensor unit; 3) a tire air pressure monitoring controller configured to warn a vehicular occupant of a tire air pressure decrease when the tire air pressure is less than or equal to a warning threshold. The tire air pressure monitoring system further comprises: 4) a puncture sensor (step S107) configured to sense a puncture of the tire, and 5) a puncture repairing agent use sensor (step S112) configured to sense whether or not the puncture is repaired by using a puncture repairing agent after the puncture is sensed. When the puncture repairing agent use sensor senses that the punctured tire is repaired by using the puncture repairing agent, the tire air pressure monitoring controller continues the warning (step S114) even though the tire air pressure from the air pressure sensor is normal.

With this, the vehicular occupant can be informed of a possible decrease in the tire air pressure after the puncture is repaired by using the puncture repairing agent In addition, sensing the puncture repairing agent use can bring about effects such as: i) the puncture repairing agent can be continuously provided for the vehicle, replacing the spare tire (accomplishing spare tireless), ii) the space for the spare tire can be used otherwise, and iii) contribution to lighter weight and lower cost compared with the conventional technology.

(2) The puncture repairing agent use sensor (step S112) senses, in the following state, that the puncture is repaired by using the puncture repairing agent: a first state where i) the tire air pressure recovers (step S108) to more than or equal to the warning threshold after the puncture is sensed, and ii) a value showing a decrease rate of the tire air pressure after the recovery of the tire air pressure is less than a repairing agent use sensing threshold (step S110) which is smaller than a value showing the decrease rate attributable to the tire air pressure decrease caused at an air pressure adjustment only without using the puncture repairing agent.

With this, though being an easy sensing method focusing on the difference in the decrease rate of the tire air pressure after the tire air pressure adjustment, the above sensing is accurate in sensing the puncture repairing agent use.

(3) The puncture sensor (step S107) senses, in the following state, that the tire is punctured: a second state where i) the value showing the decrease rate of the tire air pressure shows a decrease more than or equal to a puncture sensing threshold (step S101), and ii) the tire air pressure shows less than or equal to a puncture warning threshold (S105).

With this, though being an easy sensing method combining two tire air pressure monitorings, the puncture sensing can be accurately implemented at the puncture occurrence, the above accuracy including prevention of an erroneous sensing in a state where the user changes high pressure (for high speed way traveling) to a placard pressure (=tire setting pressure).

(4) With the tire air pressure decreased, the sensor unit transmits at least once a piece of tire air pressure information from the air pressure sensor to the tire air pressure monitoring controller, the tire air pressure monitoring controller includes: i) the puncture sensor (step S107) configured to sense the puncture based on the tire air pressure information transmitted from the sensor unit, and ii) the puncture repairing agent use sensor (step S112) configured to sense the puncture repairing agent use.

With this, despite the vehicle stop causing a long frequency of transmission from the sensor units 1, 2, 3, 4 to the control ECU 10, the puncture sensing and the puncture repairing agent use sensing can be implemented at a proper timing. For protecting the battery 23, the frequency of transmission from the air pressure sensor to the control ECU 10 is elongated during the vehicle stop.

Herein, during the stop vehicle causing the long transmission frequency, implementing the flow including puncture occurrence→rapid pressure decrease→user repairs the puncture cannot sense occurrence of puncture and the like. As a result, the puncture repairing agent use cannot be sensed, failing to send a proper warning to the user. Adding the above logic, however, can securely send the tire air pressure information to the control ECU 10 when the air pressure is decreased, thereby removing the above failing possibility.

(5) When the value showing the decrease rate of the tire air pressure is larger, the sensor unit shortens a frequency of transmitting to the tire air pressure monitoring controller the tire air pressure information from the air pressure sensor.

With this, the puncture sensing and the puncture repairing agent use sensing can be implemented at an early timing having a good responsivity.

Second Embodiment

When the tire is dismounted after the recovery of the tire air pressure, the routine senses that the puncture is repaired without using the puncture repairing agent, according to the second embodiment.

(Structure)

First, the structure of the tire air pressure monitoring system 20 is to be set forth. The entire system structure and the control block structure according to the second embodiment are, however, respectively like those in FIG. 1 and FIG. 2 according to the first embodiment. Therefore, repeated drawings and descriptions are to be omitted.

FIG. 8 is a flow chart of the tire air pressure monitoring control operations implemented by the control ECU 10, according to the second embodiment Each step is to be set forth hereinafter. Hereinafter, step S201 to step S210 and step S212 to step S214 in FIG. 8 are respectively substantially the same as step S101 to step S110 and step S112 to step S114 in FIG. 3. Therefore, description of step S201 to step S210 and step S212 to step S214 is to be omitted.

<S215>

At step S215, following the sensing at step S208 that the tire air pressure recovered to more than or equal to the puncture warning threshold Tpw, the routine senses, with an ignition switch being off, whether or not a strong acceleration G is caused only to the puncture-occurred wheel.

When Yes at step S215, the routine moves to step S216.

When No at step S215, the routine moves to step S210.

That is, monitoring an acceleration signal from the air pressure sensor 22 mounted to each of the tires 13, 14, 15, 16, the routine senses the vibration caused to each of the tires 13, 14, 15, 16, thereby sensing whether or not an acceleration more than or equal to an acceleration threshold Tacc is caused only to the puncture-occurred wheel, in other words, sensing whether or not the tire is dismounted after the recovery of the tire air pressure.

<S216> (Sensing Puncture Repairing Agent Use)

At step S216, following the sensing at step S215 that the strong acceleration G is caused only to the puncture-occurred wheel, the routine senses that the puncture is repaired without using the puncture repairing agent. Then, the routine moves to step S217.

<S217>

At step S217, following the sensing at step S216 that the puncture is repaired without using the puncture repairing agent, the routine turns off the warning lamp 12. Then, the routine moves to step S204.

Then, the operation of the tire air pressure monitoring system 20 is to be set forth, according to the second embodiment.

(Operation of Tire Air Pressure Monitoring Control)

With the decreased tire air pressure recovering to more than or equal to the puncture warning threshold Tpw after the sensing at step S207 that the puncture is caused, the routine moves from step S208 to step S215. At step S215, the routine senses, with the ignition switch being off, whether or not the strong acceleration G is caused only to the puncture-occurred wheel.

Then, when the strong acceleration G is caused only to the puncture-occurred wheel, the routine moves from step S215 to step S216→step S217→step S204. Namely, based on the sensing that the puncture repairing agent is not used (at step S216), the routine turns off the warning lamp 12 (at step S217) and then moves to the ordinary TPMS sensing logic (at step S204).

Meanwhile, when the strong acceleration G is not caused only to the puncture-occurred wheel, the routine moves from step S215 to step S210. At step S210, the routine monitors change in the tire air pressure after the recovery of the tire air pressure. Then, the routine senses whether or not the value showing the decrease rate of the tire air pressure is more than or equal to the repairing agent use sensing threshold Traus which is smaller than the value showing the decrease rate attributable to the ordinary tire air pressure decrease. In other words, the routine senses whether or not the puncture is repaired by using the puncture repairing agent.

Then, when the value showing the decrease rate of the tire air pressure is more than or equal to the repairing agent use sensing threshold Traus, the routine moves from step S210 to step S216→step S217→step S204. Namely, based on the sensing that the puncture repairing agent is not used (at step S216), the routine turns off the warning lamp 12 (at step S217) and then moves to the ordinary TPMS sensing logic (at step S204).

Meanwhile, when the value showing the decrease rate of the tire air pressure is less than the repairing agent use sensing threshold Traus, the routine moves from step S210 to step S212→step S213→step S214. Unless the tire of the puncture-occurred wheel is changed, the routine repeats movement of step S213→step S214. Namely, based on the sensing that the puncture is repaired by using the puncture repairing agent (at step S212), the routine continues lighting of the warning lamp 12 (at step S214) unless the tire is changed (at step S213).

In addition, when the tire of the puncture-occurred wheel is changed after the puncture repairing by using the puncture repairing agent, the routine moves from step S213 to step S204, turns off the warning lamp 12 and then moves to the ordinary TPMS sensing logic (at step S204).

[Principle of Tire Air Pressure Monitoring Control]

The logic added to the second embodiment is summed up below:

After the puncture occurrence: when the strong acceleration G is caused only to the puncture-occurred wheel with the ignition switch being off, the routine does not sense that the puncture repairing agent is used, even though the decrease ratio of the tire air pressure value meets the condition (at step S210) for sensing that the puncture repairing agent is used.

Based on the decrease rate of the tire air pressure, the routine senses that the puncture repairing agent is used, according to the first embodiment. However, from the above logic alone according to the first embodiment, the following two puncture repairing patterns cannot be distinguished:

i) FIG. 9A: A first pattern in which the user blocks the punctured hole by using the puncture repairing agent ii) FIG. 9B: A second pattern in which the user blocks the punctured hole by using rubber, putty and the like, instead of the puncture repairing agent.

Herein, when using the puncture repairing agent, the user ordinarily repairs the puncture with the punctured tire mounted to the vehicle 21. Meanwhile, when repairing the puncture by using rubber, putty and the like, the user ordinarily dismounts at first the punctured tire alone from the vehicle 21.

Again, when repairing the puncture by using the puncture repairing agent, the user ordinarily repairs the puncture with the punctured tire mounted to the vehicle 21. With this, as shown in FIG. 9A, i) an acceleration from the transmitter 25 (of the sensor units 1, 2, 3, 4) mounted to the tire of the puncture-occurred wheel (left in FIG. 9A) and ii) an acceleration from the transmitter 25 (of the sensor units 1, 2, 3, 4) mounted to a tire other than the tire of the puncture-occurred wheel (right in FIG. 9A) show substantially the similar characteristic. Namely, repairing the puncture with the punctured tire mounted to the vehicle 21 does not cause the acceleration G more than that caused to the other tire, in view of the acceleration signal from the sensor unit mounted to the tire of the puncture-occurred wheel.

Meanwhile, when repairing the puncture without using the puncture repairing agent, the user ordinarily dismounts the punctured tire from the vehicle. With this, as shown in FIG. 9B, the acceleration from the transmitter 25 (of the sensor units 1, 2, 3, 4) mounted to the tire of the puncture-occurred wheel (left in FIG. 9B) shows a characteristic in which the acceleration G more than the acceleration threshold Tacc is caused at the tire dismounting. Contrary to the above, the acceleration from the transmitter 25 (of the sensor units 1, 2, 3, 4) mounted to the tire other than the tire of the puncture-occurred wheel (right in FIG. 9B) shows a characteristic in which the acceleration G is less than or equal to the acceleration threshold Tacc. Namely, repairing the puncture with the punctured tire dismounted from the vehicle causes the acceleration G more than that caused to the other tire, in view of the acceleration signal from the sensor unit mounted to the tire of the puncture-occurred wheel.

After the puncture occurrence, the routine measures acceleration of each of upper, lower, left, right, front and rear parts of the puncture-occurred wheel, with the ignition switch being off (vehicle stopped for repairing puncture). With the above measurements, FIG. 9A (the first pattern in which the user blocks the punctured hole by using the puncture repairing agent) can be distinguished from FIG. 9B (the second pattern in which the user blocks the punctured hole by using rubber, putty and the like, instead of the puncture repairing agent). Other principles according to the second embodiment are substantially the same as those according to the first embodiment (Effect)

Then, effects of the tire air pressure monitoring system 20 are to be set forth, according to the second embodiment. The tire air pressure monitoring system 20 according to the second embodiment can bring about the following effects in addition to those according to the first embodiment (6) The puncture repairing agent use sensor (step S215), in the following state, senses that the puncture is repaired without using the puncture repairing agent: a third state where i) the tire air pressure recovers to more than or equal to the warning threshold after the puncture is sensed, and ii) the tire is dismounted in a stop of the vehicle after the recovery of the tire air pressure.

With this, sensing the dismounting of the tire during the vehicle stop can distinguish i) the first pattern in which the user blocks the punctured hole by using the puncture repairing agent from ii) the second pattern in which the user blocks the punctured hole by using rubber, putty and the like.

(7) Monitoring an acceleration signal from the air pressure sensor mounted to the each tire, the puncture repairing agent use sensor (step S215) senses a vibration caused to the each tire, and when the acceleration more than or equal to an acceleration threshold is caused only to a puncture-occurred wheel, the puncture repairing agent use sensor senses that the tire is dismounted.

With this, the low-cost vibration sensing by using the acceleration signal from the existing air pressure sensor can accurately sense the tire dismounting.

Third Embodiment

Instead of sensing the puncture repairing agent use based on the decrease rate of the tire air pressure according to the first embodiment, the above sensing is implemented based on variation degree of the tire air pressure according to the third embodiment (Structure)

First, the structure of the tire air pressure monitoring system 20 is to be set forth. The entire system structure and the control block structure according to the third embodiment are, however, respectively like those in FIG. 1 and FIG. 2 according to the first embodiment. Therefore, repeated drawings and descriptions are to be omitted.

FIG. 10 is a flow chart of the tire air pressure monitoring control operations implemented by the control ECU 10, according to the third embodiment. Each step is to be set forth hereinafter. Hereinafter, step S301 to step S309 and step S312 to step S314 in FIG. 10 are respectively substantially the same as step S101 to step S109 and step S112 to step S114 in FIG. 3. Moreover, step S315 to step S317 in FIG. 10 are respectively substantially the same as step S215 to step S217 in FIG. 8. Therefore, description of step S301 to step S309 and step S312 to step S317 is to be omitted.

<S318>

At step S318, following the sensing at step S315 that the strong acceleration G is not caused only to the puncture-occurred wheel with the ignition switch being off, the routine senses i) whether or not a certain air pressure sensor value is outputted from the puncture-occurred wheel only and ii) whether or not a varied air pressure sensor value is outputted from the other tires.

When Yes at step S318, the routine moves to step S312.

When No at step S318, the routine moves to step S316.

With the tire air pressure recovering to more than or equal to the warning threshold Tw after sensing the puncture, the routine, in the following state, senses that the picture is repaired by using the puncture repairing agent:

The variation of the tire air pressure of the puncture-occurred wheel is different from the variation of the tire air pressure of the other wheels.

Specifically, at step S318 for sensing the puncture repairing agent use, when a deviation between the following first and second values is more than or equal to the repairing agent use sensing threshold Traus which is determined in view of I) air pressure change attributable to temperature increase and II) air pressure fluctuation attributable to wheel rotation, the routine senses that the puncture is repaired by using the puncture repairing agent:

i) a first value showing a slope of the tire air pressure characteristic approximated by a linear function of the variation of the tire air pressure of the puncture-occurred wheel, and ii) a second value showing a slope of the tire air pressure characteristic approximated by a linear function of the variation of the tire air pressure of the wheel other than the puncture-occurred wheel.

Then, the operation of the tire air pressure monitoring system 20 is to be set forth, according to the third embodiment (Operation of Tire Air Pressure Monitoring Control)

With the decreased tire air pressure recovering to more than or equal to the puncture warning threshold Tpw after the sensing at step S307 that the puncture is caused, the routine moves from step S308 to step S315. At step S315, the routine senses, with the ignition switch being off, whether or not the strong acceleration G is caused only to the puncture-occurred wheel.

Then, when the strong acceleration G is caused only to the puncture-occurred wheel, the routine moves from step S315 to step S316→step S317→step S304. Namely, based on the sensing that the puncture repairing agent is not used (at step S316), the routine turns off the warning lamp 12 (at step S317) and then moves to the ordinary TPMS sensing logic (at step S304).

Meanwhile, when the strong acceleration G is not caused only to the puncture-occurred wheel, the routine moves from step S315 to step S318. At step S318, the routine senses i) whether or not a certain air pressure sensor value is outputted from the puncture-occurred wheel only and ii) whether or not a varied air pressure sensor value is outputted from the other tires. In other words, the routine senses whether or not the puncture is repaired by using the puncture repairing agent.

Then, sensing that i) the certain air pressure sensor value is outputted from the puncture-occurred wheel only and ii) the varied air pressure sensor value is not outputted from the other tires, the routine moves from step S318 to step S316→step S317→step S304. Namely, based on the sensing that the puncture repairing agent is not used (at step S316), the routine turns off the warning lamp 12 (at step S317) and then moves to the ordinary TPMS sensing logic (at step S304).

Meanwhile, sensing that i) the certain air pressure sensor value is outputted from the puncture-occurred wheel only and ii) the varied air pressure sensor value is outputted from the other tires, the routine moves from step S318 to step S312→step S313→step S314, and repeats step S313→step S314 unless the tire of the puncture-occurred wheel is changed. Namely, based on the sensing that the puncture is repaired by using the puncture repairing agent (at step S312), the routine continues lighting of the warning lamp 12 (at step S314) unless the tire of the puncture-occurred wheel is changed (at step S313).

In addition, when the tire of the puncture-occurred wheel is changed after the puncture repairing by using the puncture repairing agent, the routine moves from step S313 to step S304, turns off the warning lamp 12 and then moves to the ordinary TPMS sensing logic (at step S304).

[Principle of Tire Air Pressure Monitoring Control]

The logic added to the third embodiment is summed up below:

After the puncture occurrence: for sensing the puncture repairing agent use based on the change of the tire air pressure value, the routine compares i) the air pressure sensor value sent from the transmitter of the puncture-occurred wheel with ii) the air pressure sensor value sent from the transmitter of the other tire. When the variation of the air pressure sensor value of the puncture-occurred wheel is different from the variation of the air pressure sensor value of the other wheels, the routine senses that the puncture repairing agent is used.

Based on the decrease rate of the tire air pressure, the routine senses (at step S110) that the puncture repairing agent is used, according to the first embodiment Meanwhile, the sensing is implemented based on the variation degree of the tire air pressure, according to the third embodiment.

In general, due to the puncture repairing agent use, reliability of the tire air pressure monitoring system cannot be secured. Most causes for the above insecurity include the following:

The puncture repairing agent blocks the sensor hole of the air pressure sensor unit, thus allowing the transmitter to make a transmission of a certain value which is inherent in the space in the sensor.

Herein, the tire of the vehicle is to be set forth from the ignition switch off-state to the ignition switch on-state for starting traveling. With the vehicle traveling, the temperature in the tire changes, thereby changing slightly and gradually the volume in the tire. As a result, the air pressure value in the tire will slightly change according to the Boyle-Charles law. Moreover, the air pressure value may slightly change according to the rotary number (speed) of the tire.

When the puncture is repaired by using the puncture repairing agent, the air pressure sensing hole is blocked. With this, as shown in FIG. 11A, i) the air pressure sensor value from the transmitter (the sensor unit) mounted to the tire of the puncture-occurred wheel shows the certain value (left in FIG. 11A), and ii) the air pressure sensor value from the transmitter (the sensor unit) mounted to the tire other than the tire of the puncture-occurred wheel shows a variation, i.e., the variation approximated by a linear function shows a slack increase slope (right in FIG. 11A). Namely, with the air pressure sensing hole blocked, the variation of the air pressure sensor value from the transmitter (the sensor unit) mounted to the tire of the puncture-occurred wheel is different from the variation of the air pressure sensor value from the transmitter (the sensor unit) mounted to the tire other than the tire of the puncture-occurred wheel.

Meanwhile, when the puncture is repaired without using the puncture repairing agent, the air pressure sensing hole is not blocked. With this, as shown in FIG. 11B, each of i) the air pressure sensor value from the transmitter (the sensor unit) mounted to the tire of the puncture-occurred wheel (left in FIG. 11B), and ii) the air pressure sensor value from the transmitter (the sensor unit) mounted to the tire other than the tire of the puncture-occurred wheel (right in FIG. 11B) shows a variation, i.e., the variation approximated by a linear function shows a slack increase slope (right and left in FIG. 11B). Namely, with the air pressure sensing hole not blocked, the variation of the air pressure sensor value from the transmitter (the sensor unit) mounted to the tire of the puncture-occurred wheel is unlikely to be different from the variation of the air pressure sensor value from the transmitter (the sensor unit) mounted to the tire other than the tire of the puncture-occurred wheel.

Therefore, in the vehicular traveling with the ignition switch being on after the puncture occurrence, the routine monitors the variation of the tire air pressure sensor value of the sensor unit from each of i) the tire of the puncture-occurred wheel and ii) the tire other than the tire of the puncture-occurred wheel, thereby distinguishing FIG. 11A from FIG. 11B. Namely, the routine makes a distinction between: i) the first pattern in which the user blocks the punctured hole by using the puncture repairing agent and ii) the second pattern in which the user blocks the punctured hole by using rubber, putty and the like instead of the puncture repairing agent.

Herein, for sensing the difference in the variation, the routine takes the following method:

Instead of digitizing the variation per se, measuring the deviation between the following two:

Left in FIG. 11A: i) the first value showing the slope of the tire air pressure characteristic approximated by the linear function of the variation of the puncture-occurred wheel, and Right in FIG. 11A: ii) the second value showing the slope of the tire air pressure characteristic approximated by the linear function of the variation of the wheel other than the puncture-occurred wheel.

The variation is caused, as set forth above, by the tire temperature or the wheel rotation. Thereby, the puncture repairing agent use sensing threshold Traus of the deviation is determined in view of i) the air pressure change attributable to temperature increase and ii) the air pressure fluctuation attributable to wheel rotation.

Other principles according to the third embodiment are substantially the same as those according to the first embodiment.

(Effect)

Then, effects of the tire air pressure monitoring system 20 are to be set forth, according to the third embodiment.

The tire air pressure monitoring system 20 according to the third embodiment can bring about the following effects in addition to (1), (3), (4) and (5) according to the first embodiment and (6) and (7) according to the second embodiment.

(8) The puncture repairing agent use sensor (step S318), in the following state, senses that the puncture is repaired by using the puncture repairing agent: a fourth state where the tire air pressure recovers to more than or equal to the warning threshold after the puncture is sensed, and a variation of the tire air pressure of the puncture-occurred wheel is different from a variation of the tire air pressure of a wheel other than the puncture-occurred wheel, when the vehicle is traveling after the recovery of the tire air pressure.

With this, when the air pressure sensing hole is blocked at the puncture repairing by using the puncture repairing agent, the sensing of the puncture repairing agent use can be accurately implemented.

(9) The puncture repairing agent use sensor (step S318) senses, in the following state, that the puncture is repaired by using the puncture repairing agent: a fifth state where a deviation between the following values is more than or equal to the repairing agent use sensing threshold which is determined in view of I) an air pressure change attributable to a temperature increase and II) an air pressure fluctuation with a wheel rotation: i) a first value showing a slope of a tire air pressure characteristic approximated by a linear function of the variation of the tire air pressure of the puncture-occurred wheel, and ii) a second value showing a slope of a tire air pressure characteristic approximated by a linear function of the variation of the tire air pressure of the wheel other than the puncture-occurred wheel.

With this, though each of i) the air pressure change attributable to temperature increase and ii) the air pressure fluctuation attributable to wheel rotation is varied with the traveling state in the sensing, the sensing of the puncture repairing agent use can be accurately implemented.

Fourth Embodiment

Instead of sensing the puncture repairing agent use by the control ECU 10 according to the first embodiment to the third embodiment, the above sensing is implemented by each of the sensor units 1, 2, 3, 4 according to the fourth embodiment.

(Structure)

First, the structure of the tire air pressure monitoring system 20 is to be set forth. The entire system structure and the control block structure according to the fourth embodiment are, however, respectively like those in FIG. 1 and FIG. 2 according to the first embodiment. Therefore, repeated drawings and descriptions are to be omitted. In addition, according to the fourth embodiment, the logic for sensing the puncture repairing agent use is set in the sensor controller (ASIC) 27 in the sensor units 1, 2, 3, 4.

FIG. 12 is a flow chart of the tire air pressure monitoring control operations implemented by the control ECU 10, according to the fourth embodiment. Each step is to be set forth hereinafter. Hereinafter, step S401 to step S409 and step S411 to step S414 in FIG. 12 are respectively substantially the same as step S101 to step S109 and step S111 to step S114 in FIG. 3. Therefore, description of step S401 to step S409 and step S411 to step S414 is to be omitted.

<S415>

At step S415, following the sensing at step S408 that the tire air pressure recovered to more than or equal to the puncture warning threshold Tpw, the routine senses whether or not the transmission from the sensor unit of the puncture-occurred wheel is stopped or whether or not the repairing agent use information is received.

When Yes at step S415, the routine moves to step S412.
When No at step S415, the routine moves to step S411.

That is, each of the sensor units 1, 2, 3, 4 has a puncture repairing agent use sensor for sensing the puncture repairing agent use based on the tire air pressure measured by the air pressure sensor 22. Then, when the puncture repairing agent use sensor senses the puncture repairing agent use, the routine stops transmission of the tire air pressure information which is to be transmitted at a certain frequency, or transmits information on the repairing agent use. In addition, the puncture repairing agent use sensor in each of the sensor units 1, 2, 3, 4 may be the sensor according to any of the first, second and third embodiments.

Then, the operation of the tire air pressure monitoring system 20 is to be set forth, according to the fourth embodiment.

(Operation of Tire Air Pressure Monitoring Control)

With the decreased tire air pressure recovering to more than or equal to the puncture warning threshold Tpw after the sensing at step S407 that the puncture is caused, the routine moves from step S408 to step S415. At step S415, the routine senses whether or not the transmission from the sensor unit 1, 2, 3, 4 of the puncture-occurred wheel is stopped or whether or not the repairing agent use information is received. In other words, the routine senses whether or not the puncture is repaired by using the puncture repairing agent.

Then, when the transmission from the sensor unit 1, 2, 3, 4 of the puncture-occurred wheel is not stopped or the repairing agent use information is not received, the routine moves from step S415 to step S411→step S404. Namely, based on the sensing that the puncture repairing agent is not used (at step S411), the routine moves to the ordinary TPMS sensing logic (at step S404).

Meanwhile, when the transmission from the sensor unit 1, 2, 3, 4 of the puncture-occurred wheel is stopped or the repairing agent use information is received, the routine moves from step S415 to step S412→step S413→step S414. In this case, unless the tire of the puncture-occurred wheel is changed, the routine repeats movement from step S413→step S414. Namely, based on the sensing that the puncture is repaired by using the puncture repairing agent (at step S412), the routine continues lighting of the warning lamp 12 (at step S414) unless the tire is changed (at step S413).

In addition, after the puncture repairing by using the puncture repairing agent, when the tire of the puncture-occurred wheel is changed, the routine moves from step S413 step S404, turns off the warning lamp 12 and then moves to the ordinary TPMS sensing logic (at step S404).

[Principle of Tire Air Pressure Monitoring Control]

The logic of the fourth embodiment is summed up below:
According to the first embodiment to the third embodiment, it is the control ECU 10 that senses whether or not the puncture repairing agent is used. According to the fourth embodiment, however, it is the sensor units 1, 2, 3, 4 that senses whether or not the puncture repairing agent is used.

With the tire air pressure monitoring system 20 according to the fourth embodiment, when the sensor unit 1, 2, 3, 4 mounted to the puncture-occurred wheel senses the puncture repairing agent use, the routine is so configured as to stop transmission of the tire air pressure information or transmit the repairing agent use information Meanwhile, when the tire air pressure recovers to more than or equal to the puncture warning threshold Tpw (at step S408) after the puncture sensing, the control ECU 10 side continues lighting of the warning lamp 12 (at step S414) in the following state: the transmission of the tire air pressure information from the sensor unit 1, 2, 3, 4 is stopped or the repairing agent use information is received (at step S415).

With this, after the puncture is repaired by using the puncture repairing agent, the tire air pressure monitoring system 20 according to the fourth embodiment, like the first embodiment, can inform the vehicular occupant of a possible decrease in the tire air pressure.

Moreover, when the sensor unit 1, 2, 3, 4 side has both of i) the puncture sensing function and ii) the puncture repairing agent use sensing function, and is so made as to stop the transmission from the sensor unit 1, 2, 3, 4 of the puncture-occurred wheel at the sensing of the puncture repairing agent use, the control ECU has an effect that the logic is in no need of changing from the status quo.

That is, with the present tire air pressure monitoring system, when the sensor unit 1, 2, 3, 4 does not send signals for a certain time, the routine ordinarily lights the warning lamp 12 as system failure. Therefore, stopping the transmission from the sensor unit 1, 2, 3, 4 of the puncture-occurred wheel can light the warning lamp 12 when the puncture is repaired by using the puncture repairing agent.

Furthermore, when the sensor unit 1, 2, 3, 4 side has the puncture repairing agent use sensing function and the information such as "puncture repairing agent is used" and the like is transmitted from the sensor unit 1, 2, 3, 4 of the puncture-occurred wheel to the control ECU 10, it is not necessary to shorten the frequency of transmitting signals from the sensor unit 1, 2, 3, 4 to the control ECU 10 or to increase the number of transmissions, thereby saving consumption of the battery of the sensor unit 1, 2, 3, 4.

That is, during the vehicle stop, the present tire air pressure monitoring system elongates the frequency of transmitting signals to the control ECU for saving the battery. On the contrary, with the tire air pressure decrease sensed according to the fourth embodiment, the transmission frequency is shortened, thereby promptly sensing the puncture or the puncture repairing agent use, like the first embodiment. The sensor unit 1, 2, 3, 4 per se, however, has the following operations: i) sensing the puncture repairing agent use, and ii) transmitting to the control ECU 10 the information such as "puncture repairing agent is used" when the ignition switch is on. With this, once the control ECU 10 side receives the repairing agent use information, it not necessary to shorten the frequency of transmitting signals from the sensor unit 1, 2, 3, 4 to the control ECU 10.

Herein, when i) the sensor unit side has both of the puncture sensing function and the puncture repairing agent use sensing function and ii) the control ECU is totally free of changing the logic from the status quo, the following occasion may occur:

When the dealer changes the tire after the puncture repairing agent is used, changing the tire without changing the sensor unit continues the warning, despite the above tire change.

However, once the puncture repairing agent is used, the reliability of the sensor unit cannot be completely secured. Therefore, replacing the sensor unit is indispensable. With this, unless the sensor unit is replaced, continuing the warning is proper. In a nutshell, the above occasion causes no problem.

Other principles according to the fourth embodiment are substantially the same as those according to the first embodiment.

(Effect)

Then, effects of the tire air pressure monitoring system 20 are to be set forth, according to the fourth embodiment.

The tire air pressure monitoring system 20 according to the fourth embodiment can bring about the following effects in addition to (1) and (3) according to the first embodiment.

(10) The sensor unit includes the puncture repairing agent use sensor configured to sense the puncture repairing agent use based on the tire air pressure measured by the air pressure sensor.

With this, the following effects are bought about:
i) The logic is in no need of changing from the status quo, and
ii) When the puncture is repaired by using the puncture repairing agent in such a manner as to save consumption of the battery of the sensor unit 1, 2, 3, 4, the vehicular occupant can be informed thereafter of a possible decrease in the tire air pressure.

(11) When the puncture repairing agent use sensor senses the puncture repairing agent use, the sensor unit stops transmitting a piece of tire air pressure information or transmits a piece of repairing agent use information, and when the tire air pressure recovers (step S408) to more than or equal to the warning threshold after the puncture is sensed (step S407), the tire air pressure monitoring controller is configured to continue the warning (step S414), in one of the following states: i) a sixth state where the transmission of the tire air pressure information from the sensor unit is stopped (step S415), and ii) a seventh state where the repairing agent use information is received (step S415).

With this, the easy logic omitting from the control ECU 10 side the puncture repairing agent use sensing can inform the vehicular occupant of the puncture repairing using the puncture repairing agent.

Fifth Embodiment

The puncture sensing threshold Ts and the repairing agent use sensing threshold Traus are changed based on the tire temperature information, according to the fifth embodiment.

(Structure)

First, the structure of the tire air pressure monitoring system 20 is to be set forth. The entire system structure and the control block structure according to the fifth embodiment are, however, respectively like those in FIG. 1 and FIG. 2 according to the first embodiment. Therefore, repeated drawings and descriptions are to be omitted.

FIG. 13 is a flow chart of the tire air pressure monitoring control operations implemented by the control ECU 10, according to the fifth embodiment Each step is to be set forth hereinafter. Hereinafter, step S501 to step S510 and step S512 to step S514 in FIG. 13 are respectively substantially the same as step S101 to step S110 and step S112 to step S114 in FIG. 3. Moreover, step S515 to step S518 in FIG. 13 are respectively substantially the same as step S315 to step S318 in FIG. 10. Therefore, description of step S501 to step S510, step S512 to step S514 and step S515 to step S518 is to be omitted.

<S500>

At step S500, the control operation is started with pieces of information received from each of the sensor units 1, 2, 3, 4. Then, based on the tire temperature information of the thus received pieces of information, the routine sets the puncture sensing threshold Ts showing the decrease rate of the tire air pressure for sensing the puncture. Then, the routine moves to step S501.

<S519>

At step S519, following the sensing at step S515 sensing that the strong acceleration G is not caused only to the puncture-occurred wheel with the ignition switch being off, the routine sets the repairing agent use sensing threshold Traus (showing the decrease rate of the tire air pressure for sensing the puncture repairing agent use) based on the tire temperature information of the thus received pieces of information from each of the sensor units 1, 2, 3, 4. Then, the routine moves to step S510.

In addition, settings of the puncture sensing threshold Ts at step S500 and the repairing agent use sensing threshold Traus at step S519 which are based on the tire temperature are implemented according to the Boyle-Charles law showing temperature relative to air pressure.

Then, the operation of the tire air pressure monitoring system 20 is to be set forth, according to the fifth embodiment.

(Operation of Tire Air Pressure Monitoring Control)

First, the puncture sensing is to be set forth.

In the flow chart of FIG. 13, the routine moves from step S500→step S501. At step S500, the routine sets the puncture sensing threshold Ts based on the tire temperature. At step S501, when the value showing the decrease rate of the tire air pressure is more than or equal to the puncture sensing threshold Ts set at step S500, the routine senses that the puncture is highly possible, then moves to step S505. Then, with the tire air pressure less than or equal to the puncture warning threshold Tpw at step S505, the routine moves to step S507, sensing the puncture occurrence.

Then, the puncture repairing agent use sensing is to be set forth With the decreased tire air pressure recovering to more than or equal to the puncture warning threshold Tpw value after the sensing at step S507 that the puncture is caused, and the strong acceleration G is not caused only to the puncture-occurred wheel, the routine moves from step S507 to step S508→step S515→step S519→step S510 in the flow chart of FIG. 13. At step S519, the routine sets the repairing agent use sensing threshold Traus based on the tire temperature. At step S510, the routine monitors the change in the tire air pressure after the recovery of the tire air pressure, to thereby sense whether or not the value showing the decrease rate of the tire air pressure is more than or equal to the repairing agent use sensing threshold Traus which was set based on the tire temperature at step S519. Then, at step S510, when the value showing the decrease rate of the tire air pressure is less than the repairing agent use sensing threshold Traus, the routine moves from step S510 to step S512, to thereby sense that the puncture is repaired by using the puncture repairing agent.

[Principle of Tire Air Pressure Monitoring Control]

First, a method of correcting the puncture sensing threshold Ts based on the tire temperature is to be set forth.

Ordinarily, the Boyle-Charles law shows temperature relative to air pressure in the following expression.

$$PV=nRT \quad (1)$$

P: pressure
V: volume (volume in tire is substantially constant)
n: Mol (constant in a closed space, e.g., in tire)
R: constant
T: absolute temperature (Celsius temperature+273.15)

Thus, in the tire, the expression (1) can be simplified to $P \approx kT$ (k: constant).

For easier calculation, such a logic is premised that the puncture repairing agent use sensing threshold Traus is defined as 10% decrease in air pressure per hour.

For example, the premises is so made that the temperature in the tire is rapidly decreased due to stop of the vehicle from traveling (decreased from 77° C. to 27° C. per hour). In this case, the absolute temperature drops from 350° C. to 300° C. Being substantially proportional to the absolute temperature, the tire air pressure theoretically decreases by $(50/350) \approx 14\%$ per hour, without the puncture.

As a result, without correcting the threshold based on temperature, the puncture repairing agent use is likely to be erroneously sensed.

On the contrary, in terms of a basic method of correcting the threshold in the above example (absolute temperature decreased from 350° C. to 300° C.), the threshold is to be changed in the following expression.

Herein, the repairing agent use sensing threshold Traus at a constant temperature as the premise is set to 0.9 (=ordinarily, 10% air pressure decrease per hour).

$$100-\{(300/350) \times 0.9\} \times 100 \approx 23\%$$

Thus, with the temperature in the tire decreased from 77° C. to 27° C. per hour, the tire air pressure decrease more than or equal to 23% per hour is defined as the threshold. Namely, the repairing agent use sensing threshold Traus is changed from 10% 23% at a constant temperature.

Other principles according to the fifth embodiment are substantially the same as those according to the first, second and third embodiments.

(Effect)

Then, effects of the tire air pressure monitoring system 20 are to be set forth, according to the fifth embodiment.

The tire air pressure. monitoring system 20 according to the fifth embodiment can bring about the following effects in addition to those according to the first, second, third and fourth embodiments.

(12) Based on a piece of tire temperature information, the puncture sensor (step S501) sets the puncture sensing threshold showing the decrease rate of the tire air pressure for sensing the puncture.

With this, the puncture sensing can be implemented accurately irrespective of the tire temperature change in the above sensing.

(13) Based on a piece of tire temperature information, the puncture repairing agent use sensor (step S501) sets the repairing agent use sensing threshold showing the decrease rate of the tire air pressure for sensing the puncture repairing agent use.

With this, the puncture repairing agent use sensing can be implemented accurately irrespective of the tire temperature change in the above sensing.

The tire air pressure monitoring system 20 has been set forth according to the first embodiment to the fifth embodiment of the present invention. The present invention is, however, not limited to the above embodiments. Namely, change, addition and the like of design are allowed within the scope of the present invention.

The puncture sensing and the puncture repairing agent use sensing are implemented by the tire air pressure monitoring controller (the control ECU 10), according to the first, second, third and fifth embodiments. Meanwhile, the puncture repairing agent use sensing is implemented by the sensor units 1, 2, 3, 4 and the puncture sensing is implemented by the tire air pressure monitoring controller (the control ECU 10), according to the fourth embodiment. The present invention is, however, not limited to the above. Both of the puncture sensing and the puncture repairing agent use sensing may be implemented by the sensor units 1, 2, 3, 4. Or a puncture sensing signal may be inputted from other control system. In a nutshell, any other tire air pressure monitoring system including the following structural elements 1) and 2) and the following operation is within the scope of the present invention:

1) a puncture sensor for sensing puncture of each tire, and 2) a puncture repairing agent use sensor for sensing, after the puncture sensing, whether or not the puncture is repaired by using a puncture repairing agent.

Operation: with the punctured tire sensed to be repaired by using the puncture repairing agent, a tire air pressure monitoring controller continues warning even though a tire air pressure value from an air pressure sensor is in a normal state.

According to the first to fifth embodiments, the tire air pressure monitoring system 20 is applied to the engine vehicle. The tire air pressure monitoring system 20 is, however, also applicable to a hybrid vehicle, an electric vehicle, a fuel cell vehicle and the like.

This application is based on a prior Japanese Patent Application No. P2006-017180 (filed on Jan. 26, 2006 in Japan). The entire contents of the Japanese Patent Application No. P2006-017180 from which priority is claimed are incorporated herein by reference, in order to take some protection against translation errors or omitted portions.

The scope of the present invention is defined with reference to the following claims.

What is claimed is:

1. A tire air pressure monitoring system, comprising:
1) a sensor unit configured to be mounted to each tire of a vehicle and including:
   i) an air pressure sensor configured to output a tire air pressure, and
   ii) a transmitter configured to transmit a radio wave;
2) a receiver configured to receive the radio wave transmitted from the sensor unit;
3) a tire air pressure monitoring controller configured to warn a vehicular occupant of a tire air pressure decrease when the tire air pressure is less than or equal to a warning threshold, the tire air pressure monitoring system further comprising:
4) a puncture sensor configured to sense a puncture of the tire, and
5) a puncture repairing agent use sensor configured to sense whether or not the puncture is repaired by using a puncture repairing agent after the puncture is sensed, wherein when the puncture repairing agent use sensor senses that the punctured tire is repaired by using the puncture repairing agent, the tire air pressure monitoring controller continues the warning even though the tire air pressure from the air pressure sensor is normal.

2. The tire air pressure monitoring system as claimed in claim 1, wherein
the puncture repairing agent use sensor senses, in the following state, that the puncture is repaired by using the puncture repairing agent:
a first state where
   i) the tire air pressure recovers to more than or equal to the warning threshold after the puncture is sensed, and
   ii) a value showing a decrease rate of the tire air pressure after the recovery of the tire air pressure is less than a repairing agent use sensing threshold which is smaller than a value showing the decrease rate attributable to the tire air pressure decrease caused at an air pressure adjustment only without using the puncture repairing agent.

3. The tire air pressure monitoring system as claimed in claim 1, wherein
the puncture sensor senses, in the following state, that the tire is punctured:

a second state where
   i) the value showing the decrease rate of the tire air pressure shows a decrease more than or equal to a puncture sensing threshold, and
   ii) the tire air pressure shows less than or equal to a puncture warning threshold.

4. The tire air pressure monitoring system as claimed in claim 1, wherein
with the tire air pressure decreased, the sensor unit transmits at least once a piece of tire air pressure information from the air pressure sensor to the tire air pressure monitoring controller,
the tire air pressure monitoring controller includes:
   i) the puncture sensor configured to sense the puncture based on the tire air pressure information transmitted from the sensor unit, and
   ii) the puncture repairing agent use sensor configured to sense the puncture repairing agent use.

5. The tire air pressure monitoring system as claimed in claim 4, wherein
when the value showing the decrease rate of the tire air pressure is larger, the sensor unit shortens a frequency of transmitting to the tire air pressure monitoring controller the tire air pressure information from the air pressure sensor.

6. The tire air pressure monitoring system as claimed in claim 1, wherein
the puncture repairing agent use sensor, in the following state, senses that the puncture is repaired without using the puncture repairing agent:
a third state where
   i) the tire air pressure recovers to more than or equal to the warning threshold after the puncture is sensed, and
   ii) the tire is dismounted in a stop of the vehicle after the recovery of the tire air pressure.

7. The tire air pressure monitoring system as claimed in claim 6, wherein
monitoring an acceleration signal from the air pressure sensor mounted to the each tire, the puncture repairing agent use sensor senses a vibration caused to the each tire, and
when the acceleration more than or equal to an acceleration threshold is caused only to a puncture-occurred wheel, the puncture repairing agent use sensor senses that the tire is dismounted.

8. The tire air pressure monitoring system as claimed in claim 1, wherein
the puncture repairing agent use sensor, in the following state, senses that the puncture is repaired by using the puncture repairing agent:
a fourth state where
   the tire air pressure recovers to more than or equal to the warning threshold after the puncture is sensed, and
   a variation of the tire air pressure of the puncture-occurred wheel is different from a variation of the tire air pressure of a wheel other than the puncture-occurred wheel, when the vehicle is traveling after the recovery of the tire air pressure.

9. The tire air pressure monitoring system as claimed in claim 8, wherein
the puncture repairing agent use sensor senses, in the following state, that the puncture is repaired by using the puncture repairing agent:
a fifth state where
   a deviation between the following values is more than or equal to the repairing agent use sensing threshold which is determined in view of I) an air pressure change attributable to a temperature increase and II) an air pressure fluctuation with a wheel rotation:
- i) a first value showing a slope of a tire air pressure characteristic approximated by a linear function of the variation of the tire air pressure of the puncture-occurred wheel, and
- ii) a second value showing a slope of a tire air pressure characteristic approximated by a linear function of the variation of the tire air pressure of the wheel other than the puncture-occurred wheel.

10. The tire air pressure monitoring system as claimed in claim 1, wherein
the sensor unit includes the puncture repairing agent use sensor configured to sense the puncture repairing agent use based on the tire air pressure measured by the air pressure sensor.

11. The tire air pressure monitoring system as claimed in claim 10, wherein
when the puncture repairing agent use sensor senses the puncture repairing agent use, the sensor unit stops transmitting a piece of tire air pressure information or transmits a piece of repairing agent use information, and
when the tire air pressure recovers to more than or equal to the warning threshold after the puncture is sensed, the tire air pressure monitoring controller is configured to continue the warning, in one of the following states:
- i) a sixth state where the transmission of the tire air pressure information from the sensor unit is stopped, and
- ii) a seventh state where the repairing agent use information is received.

12. The tire air pressure monitoring system as claimed in claim 1, wherein
based on a piece of tire temperature information, the puncture sensor sets the puncture sensing threshold showing the decrease rate of the tire air pressure for sensing the puncture.

13. The tire air pressure monitoring system as claimed in claim 1, wherein
based on a piece of tire temperature information, the puncture repairing agent use sensor sets the repairing agent use sensing threshold showing the decrease rate of the tire air pressure for sensing the puncture repairing agent use.

14. A method of monitoring-controlling a tire air pressure, comprising:
1) sensing the tire air pressure, including the following sub-operations:
- i) outputting the tire air pressure, and
- ii) transmitting a radio wave;

2) a receiving the radio wave transmitted from the transmitting;

3) monitoring-controlling to warn a vehicular occupant of a tire air pressure decrease when the tire air pressure is less than or equal to a warning threshold,
the monitoring-controlling further comprising:

4) puncture sensing for sensing a puncture of a tire, and 5) puncture repairing agent use sensing for sensing whether or not the puncture is repaired by using a puncture repairing agent after the puncture sensing, wherein
when the puncture repairing agent use sensing senses that the punctured tire is repaired by using the puncture repairing agent, the monitoring-controlling continues the warning even though the tire air pressure from the outputting is normal.

15. A tire air pressure monitoring system, comprising:
1) sensing means mounted to each tire of a vehicle and including:
- i) air pressure sensing means for outputting a tire air pressure, and
- ii) transmitting means for transmitting a radio wave;

2) receiving means for receiving the radio wave transmitted from the sensing means;

3) monitoring-controlling means for warning a vehicular occupant of a tire air pressure decrease when the tire air pressure is less than or equal to a warning threshold,
the tire air pressure monitoring system further comprising:

4) puncture sensing means for sensing a puncture of the tire, and 5) puncture repairing agent use sensing means for sensing whether or not the puncture is repaired by using a puncture repairing agent after the puncture is sensed, wherein
when the puncture repairing agent use sensing means senses that the punctured tire is repaired by using the puncture repairing agent, the monitoring-controlling means continues the warning even though the tire air pressure from the air pressure sensing means is normal.

16. A tire air pressure monitoring system, comprising:
1) a sensor unit configured to be mounted to each tire of a vehicle and including:
- i) an air pressure sensor configured to output a tire air pressure, and
- ii) a transmitter configured to transmit a radio wave; and 2) a receiver configured to receive the radio wave transmitted from the sensor unit;

wherein
the tire air pressure monitoring system is configured to warn a vehicular occupant of a tire air pressure decrease when the tire air pressure is less than or equal to a warning threshold, and
in a case that a puncture is sensed to occur to the tire:
when the punctured tire is sensed to be repaired by using a puncture repairing agent, the tire air pressure monitoring system continues the warning even though the tire air pressure from the air pressure sensor is normal.

17. A tire air pressure sensor unit configured to be mounted to each tire of a vehicle and including an air pressure sensor and a transmitter, the tire air pressure sensor unit comprising:
1) a puncture sensor configured to sense a puncture of the tire, and
2) a puncture repairing agent use sensor configured to sense whether or not the puncture is repaired by using a puncture repairing agent after the puncture is sensed,
wherein
when the punctured tire is sensed to be repaired by using the puncture repairing agent, the tire air pressure sensor unit stops transmitting a piece of tire air pressure information or transmits a piece of repairing agent use information.

* * * * *